(12) United States Patent
Sasaki

(10) Patent No.: US 9,891,876 B2
(45) Date of Patent: Feb. 13, 2018

(54) FACSIMILE DEVICE AND IMAGE FORMING DEVICE LINKAGE SYSTEM, LINKAGE DEVICE, AND LINKAGE METHOD

(71) Applicant: Tohru Sasaki, Kanagawa (JP)

(72) Inventor: Tohru Sasaki, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 15/223,143

(22) Filed: Jul. 29, 2016

(65) Prior Publication Data

US 2017/0039016 A1 Feb. 9, 2017

(30) Foreign Application Priority Data

Aug. 4, 2015 (JP) .................. 2015-154488

(51) Int. Cl.
G06F 3/12 (2006.01)
H04N 1/00 (2006.01)
(52) U.S. Cl.
CPC ............ *G06F 3/1288* (2013.01); *G06F 3/126* (2013.01); *G06F 3/1211* (2013.01);
(Continued)
(58) Field of Classification Search
CPC .... G06F 3/1288; G06F 3/1289; G06F 3/1211; G06F 3/1236; G06F 3/1268; H04N 1/00206; H04N 1/00209; H04N 1/0022; H04N 1/00222; H04N 1/00233; H04N 1/00485; H04N 1/00236; H04N 1/00244; H04N 2201/0094; H04N 2201/0082; H04N 2201/00
(Continued)

(56) References Cited

U.S. PATENT DOCUMENTS 6,952,279 B1 * 10/2005 Iida ................. H04N 1/00244
358/1.15
8,310,730 B2 * 11/2012 Lee ................. H04N 1/00214
358/400
(Continued)

FOREIGN PATENT DOCUMENTS

JP 3684982 6/2005
JP 5004746 6/2012

OTHER PUBLICATIONS

U.S. Appl. No. 15/061,672, filed Mar. 4, 2016.

*Primary Examiner* — Benny Q Tieu
*Assistant Examiner* — Juan M Guillermety
(74) *Attorney, Agent, or Firm* — Harness, Dickey & Pierce

(57) ABSTRACT

A linkage system includes a facsimile device, an image forming device, and a linkage device through a network. The facsimile device includes a receiver configured to receive a facsimile document through a public line, and a notifying unit configured to transmit reception information about the facsimile document together with a reception event indicating that the facsimile document is received to the linkage device. The linkage device includes a linkage controller configured to transmit a print request to print the facsimile document included in the reception information to the image forming device when the reception event and the reception information are received. The image forming device includes a printing unit configured to print the facsimile document based on the print request.

4 Claims, 14 Drawing Sheets

(52) U.S. Cl.
CPC ....... *G06F 3/1236* (2013.01); *H04N 1/00244* (2013.01); *H04N 2201/0082* (2013.01); *H04N 2201/0093* (2013.01); *H04N 2201/0094* (2013.01)

(58) Field of Classification Search
USPC .............................................. 358/1.14, 1.15
See application file for complete search history.

(56) References Cited

U.S. PATENT DOCUMENTS

| | | | |
|---|---|---|---|
| 2002/0138557 A1 | 9/2002 | Mukaiyama et al. | |
| 2002/0161830 A1 | 10/2002 | Mukaiyama et al. | |
| 2002/0161831 A1 | 10/2002 | Nakaoka et al. | |
| 2002/0186408 A1 | 12/2002 | Nakaoka et al. | |
| 2003/0095290 A1* | 5/2003 | Koreeda | H04N 1/00209 358/402 |
| 2005/0213135 A1* | 9/2005 | Asai | H04N 1/32363 358/1.13 |
| 2005/0228941 A1* | 10/2005 | Abe | G06F 11/1666 711/113 |
| 2007/0027990 A1 | 2/2007 | Nakaoka et al. | |
| 2009/0100123 A1 | 4/2009 | Sato | |
| 2011/0184998 A1* | 7/2011 | Palahnuk | G06F 21/6263 707/827 |
| 2012/0050795 A1* | 3/2012 | Nakamura | G06F 3/1259 358/1.15 |
| 2012/0144329 A1 | 6/2012 | Sasaki | |
| 2012/0243036 A1* | 9/2012 | Aoki | G06F 3/1207 358/1.15 |
| 2013/0088741 A1* | 4/2013 | Murata | H04N 1/0022 358/1.14 |
| 2013/0329253 A1 | 12/2013 | Sasaki | |
| 2014/0176993 A1* | 6/2014 | Kato | H04N 1/00244 358/1.15 |
| 2014/0176995 A1* | 6/2014 | Nakawaki | H04N 1/00244 358/1.15 |
| 2014/0270093 A1* | 9/2014 | Lum | H04L 65/1006 379/1.02 |
| 2015/0131120 A1* | 5/2015 | Harigae | H04N 1/00209 358/1.15 |
| 2015/0271353 A1 | 9/2015 | Nishimura et al. | |
| 2016/0080200 A1 | 3/2016 | Ishii et al. | |
| 2016/0080588 A1 | 3/2016 | Sasaki et al. | |
| 2016/0212114 A1 | 7/2016 | Kuroyanagi et al. | |
| 2016/0217174 A1* | 7/2016 | Takahashi | G06F 17/30362 |

* cited by examiner

FACSIMILE DEVICE AND IMAGE FORMING DEVICE LINKAGE SYSTEM, LINKAGE DEVICE, AND LINKAGE METHOD

CROSS-REFERENCE TO RELATED APPLICATION

The present application claims priority under 35 U.S.C. § 119 to Japanese Patent Application No. 2015-154488, filed Aug. 4, 2015. The contents of which are incorporated herein by reference in their entirety.

BACKGROUND OF THE INVENTION

1. Field of the Invention

The present invention relates to a linkage system, a linkage device, and a linkage method.

2. Description of the Related Art

A facsimile linkage system in which a facsimile device transfers reception data to another device, and after receiving the transferred data, the device prints the facsimile document, has been known.

For example, in Japanese Patent No. 3684982, a print transfer system in which print data is transmitted from a client to a printer through a server connected to a network, to achieve practical printing is proposed. Moreover, for example, Japanese Patent No. 5004746 discloses a data communication system in which a server device that has received facsimile data transfers data requested by a user to a client device, to enhance the convenience of a transfer-data receiving side.

However, in a conventional linkage system, a facsimile function is required to be equipped with also in a device receiving transfer data from a facsimile device. Therefore, specific devices are enabled to be linked to a facsimile device, and there has been a problem that the installation cost at the time of environment construction increases.

SUMMARY OF THE INVENTION

According to one aspect of the present invention, a linkage system includes a facsimile device, an image forming device, and a linkage device through a network. The facsimile device includes a receiver configured to receive a facsimile document through a public line, and a notifying unit configured to transmit reception information about the facsimile document together with a reception event indicating that the facsimile document is received to the linkage device. The linkage device includes a linkage controller configured to transmit a print request to print the facsimile document included in the reception information to the image forming device when the reception event and the reception information are received. The image forming device includes a printing unit configured to print the facsimile document based on the print request.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
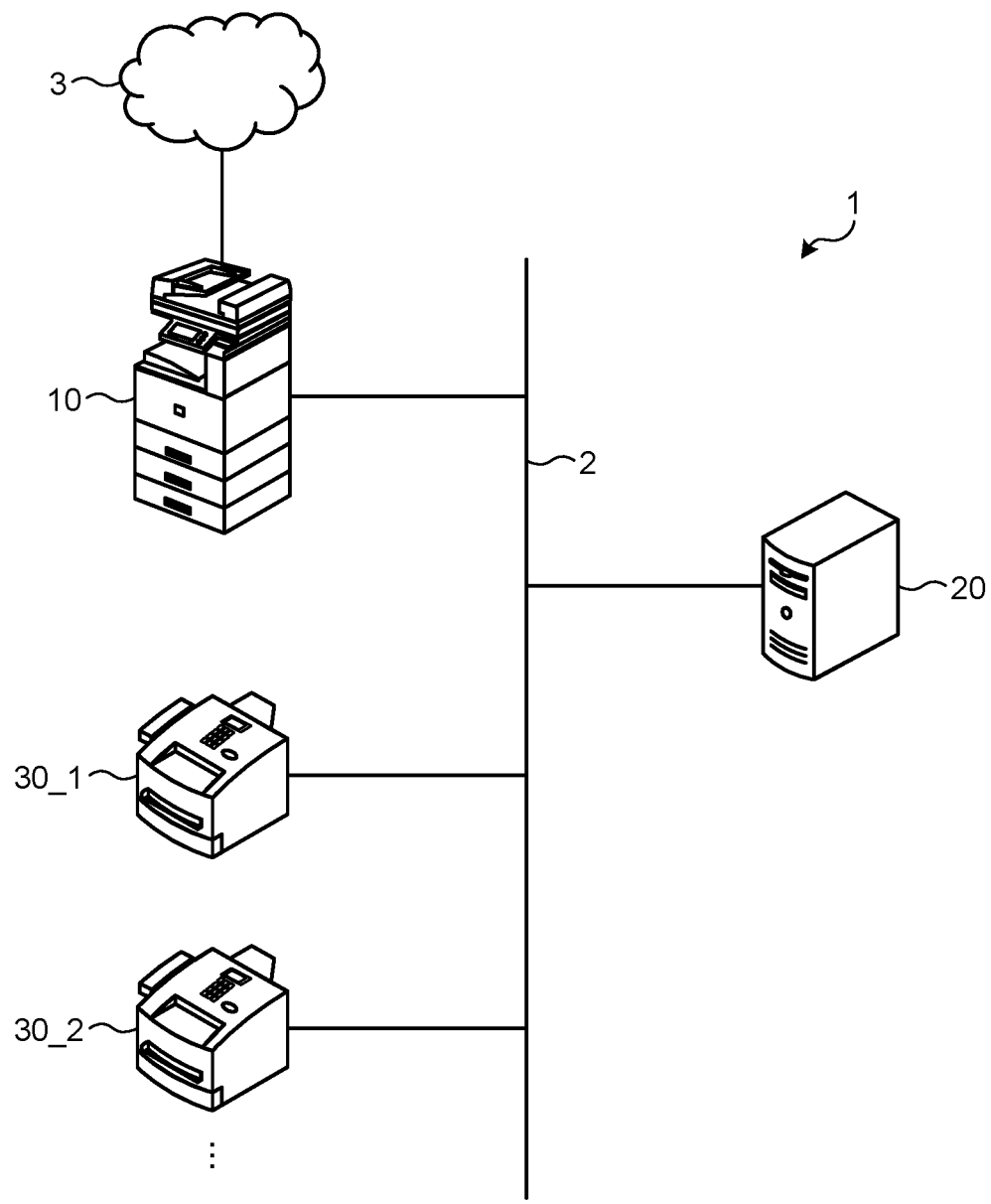
FIG. 1 is a schematic diagram showing one example of a linkage system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the present invention will be described in detail below with reference to the drawings.

An object of the present invention is to provide a linkage system, a linkage device, and a linkage method enabling to reduce the installation cost at the time of environment construction.

First Embodiment

FIG. 1 is a schematic diagram showing one example of a linkage system 1 according to a first embodiment. As illustrated in FIG. 1, the linkage system 1 includes a facsimile device 10, a linkage server 20, and one or mode printer devices 30 (30_1 to 30_n). The facsimile device 10, the linkage server 20, and the one or more printer devices 30 (30_1 to 30_n) are connected through a network such as the Internet. The linkage server 20 is one example of a linkage device, and the printer device is one example of an image forming device.

The facsimile device 10 receives a facsimile document through a public line 3, and transmits facsimile reception information including the received facsimile document to the linkage server 20. The facsimile reception information is information about a facsimile, and is information including, for example, a facsimile document identification (ID), a time of reception, the number of sheets received, a source name, counterpart information, line information received by a facsimile device, a dial-in number, and the like in addition to image data of a facsimile document, but is not limited thereto.

The linkage server 20 links the facsimile device 10 and the printer device 30 through the network 2, and transmits a print request to the printer device 30 based on the facsimile reception information transmitted from the facsimile device 10. As the network 2, for example, a local area network (LAN), the Internet, or the like can be applied.

The printer device 30 prints the facsimile document received by the facsimile device 10, based on the print request transmitted from the linkage server 20. In the present embodiment, it is assumed that the printer device 30 has no facsimile function.

According to the linkage system 1, because the linkage server 20 transmits a print request to the printer device 30 based on the facsimile reception information transmitted from the facsimile device 10, the printer device 30 without a facsimile function can print the facsimile document. That is, a device linkable to the facsimile device 10 is not limited to a device equipped with a facsimile function, but includes the printer device 30 only equipped with a print function. Therefore, a wide variety of devices can be selected as a device linkable to the facsimile device 10. Furthermore, because a facsimile document can be printed as long as a device linkable to the facsimile device 10 has at least a print function, the cost of the device can be lowered.

Note that the system configuration explained in the present embodiment is one example, and it is needless to say that there are various system configuration examples according to a use or a purpose. For example, not arranged as an independent server, the linkage server may be built in an image forming device, such as a printer device, a copier, a multifunction peripheral, a scanner device, and a facsimile device, and be configured to connect the image forming device with the facsimile device and the printer device through a network.

Figure 2:
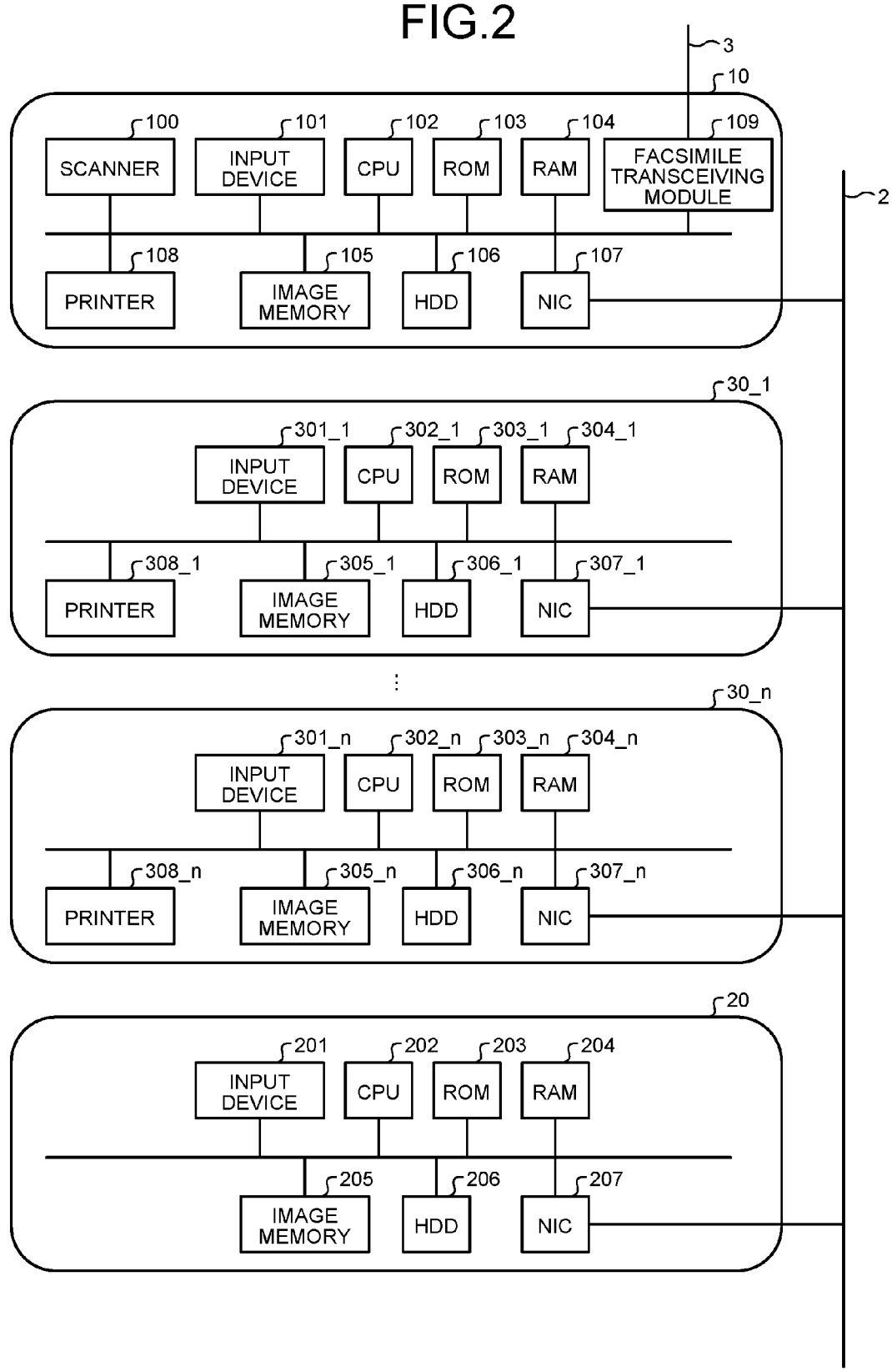
FIG. 2 is a block diagram showing one example of a hardware configuration of a facsimile device, a linkage server, and a printer device according to the first embodiment.

FIG. 2 is a block diagram illustrating one example of a system configuration of the linkage system, and a hardware configuration of the facsimile device 10, the linkage server 20, and the printer device 30 according to the first embodiment.

As illustrated in FIG. 2, the facsimile device 10 includes a scanner 100, an input device 101, a central processing unit (CPU) 102, a read-only memory (ROM) 103, a random access memory (RAM) 104, an image memory 105, a hard disk drive (HDD) 106, a network interface controller (NIC) 107, a printer 108, and a facsimile transceiving module 109. The NIC 107 is connected to the network 2, and the facsimile transceiving module 109 is connected to the public line 3. Moreover, the scanner 100, the input device 101, the CPU 102, the ROM 103, the RAM 104, the image memory 105, the HDD 106, the NIC 107, the printer 108, and the facsimile transceiving module 109 are connected to each other thorough a bus.

The scanner 100 electronically scans an original, to create image data. The input device 101 has a liquid crystal display (LCD), a light emitting diode (LED), a buzzer, a hard key, a touch panel, and the like, displays various kinds of information on the LCD, and receives an input of various kinds of information from the hard key, the touch panel, and the like. The CPU 102 performs on various kinds of image processing image data. Moreover, the CPU 102 executes a program, which is stored in the ROM 103, in the RAM 104, and controls the scanner 100, the input device 101, the image memory 105, the HDD 106, the NIC 107, the printer 108, the facsimile transceiving module 109, and the like.

The ROM 103 stores a program executed by the CPU 102, data, and the like. From and to the RAM 104, a program, data, and the like are read and written, and the RAM 104 is used as a work area of the CPU 102. The image memory 105 stores image data subjected to various kinds of image processing. The HDD 106 stores setting data used by the CPU 102, image data subjected to various kinds of image processing, and the like. The NIC 107 is a communication interface to connect a device to a network, through the network 2. The printer 108 prints image data subjected to various kinds of image processing on a sheet. The facsimile transceiving module 109 transmits image data to the public line 3 by facsimile, and receives image data from the public line 3 by facsimile.

Furthermore, as illustrated in FIG. 2, the linkage server 20 includes an input device 201, a CPU 202, a ROM 203, a RAM 204, an image memory 205, an HDD 206, and a NIC 207. The NIC 207 is connected to the network 2. Moreover, the input device 201, the CPU 202, the ROM 203, the RAM 204, the image memory 205, the HDD 206, and the NIC 207 are connected to each other through a bus.

The input device 201 includes an LCD, an LED, a buzzer, a hard key, a touch panel, and the like, and displays various kinds of information on the LCD, and receives various kinds of information from the hard key, the touch panel, and the like. The CPU 202 performs various kinds of image processing on image data. Moreover, the CPU 202 performs a program, which is stored in the ROM 203, in the RAM 204, and controls the input device 201, the image memory 205, the HDD 206, the NIC 207, and the like.

The ROM 203 stores a program executed by the CPU 202, data, and the like. From and to the RAM 204, a program, data, and the like are read and written, and the RAM 204 is used as a work area of the CPU 202. The image memory 205 stores image data subjected to various kinds of image processing. The HDD 206 stores setting data used by the CPU 202, image data subjected to various kinds of image processing, and the like. The NIC 207 is a communication interface to connect a device to a network, through the network 2.

Furthermore, as illustrated in FIG. 2, the printer device 30 (30_1 to 30_n) includes an input device 301 (301_1 to 301_n), a CPU 302 (302_1 to 302_n), a ROM 303 (303_1 to 303_n), a RAM 304 (304_1 to 304_n), an image memory 305 (305_1 to 305_n), an HDD 306 (306_1 to 306_n), a NIC 307 (307_1 to 307_n), and a printing unit 308 (308_1 to 308_n). The NIC 307 is connected to the network 2. Moreover, the input device 301, the CPU 302, the ROM 303, the RAM 304, the image memory 305, the HDD 306, the NIC 307, and the printing unit 308 are connected to each other through a bus.

The input device 301 includes an LCD, an LED, a buzzer, a hard key, a touch panel, and the like, and displays various kinds of information on the LCD, and receives an input of various kinds of information from the hard key, the touch panel, and the like. The CPU 302 performs various kinds of image processing on image data. Moreover, the CPU 302 executes a program, which is stored in the ROM 303, in the RAM 304, and controls the input device 301, the image memory 305, the HDD 306, the NIC 307, the printing unit 308, and the like.

The ROM 303 stores a program executed by the CPU 302, data, and the like. From and to the RAM 304, a program, data, and the like are read and written, and the RAM 304 is used as a work area of the CPU 302. The image memory 305 stores image data subjected to various kinds of image processing. The HDD 306 stores setting data used by the CPU 302, image data subjected to various kinds of image processing, and the like. The NIC 307 is a communication interface to connect a device to a network, through the network 2. The printing unit 308 prints image data having been subjected to various kinds of image processing on a sheet.

Figure 3:
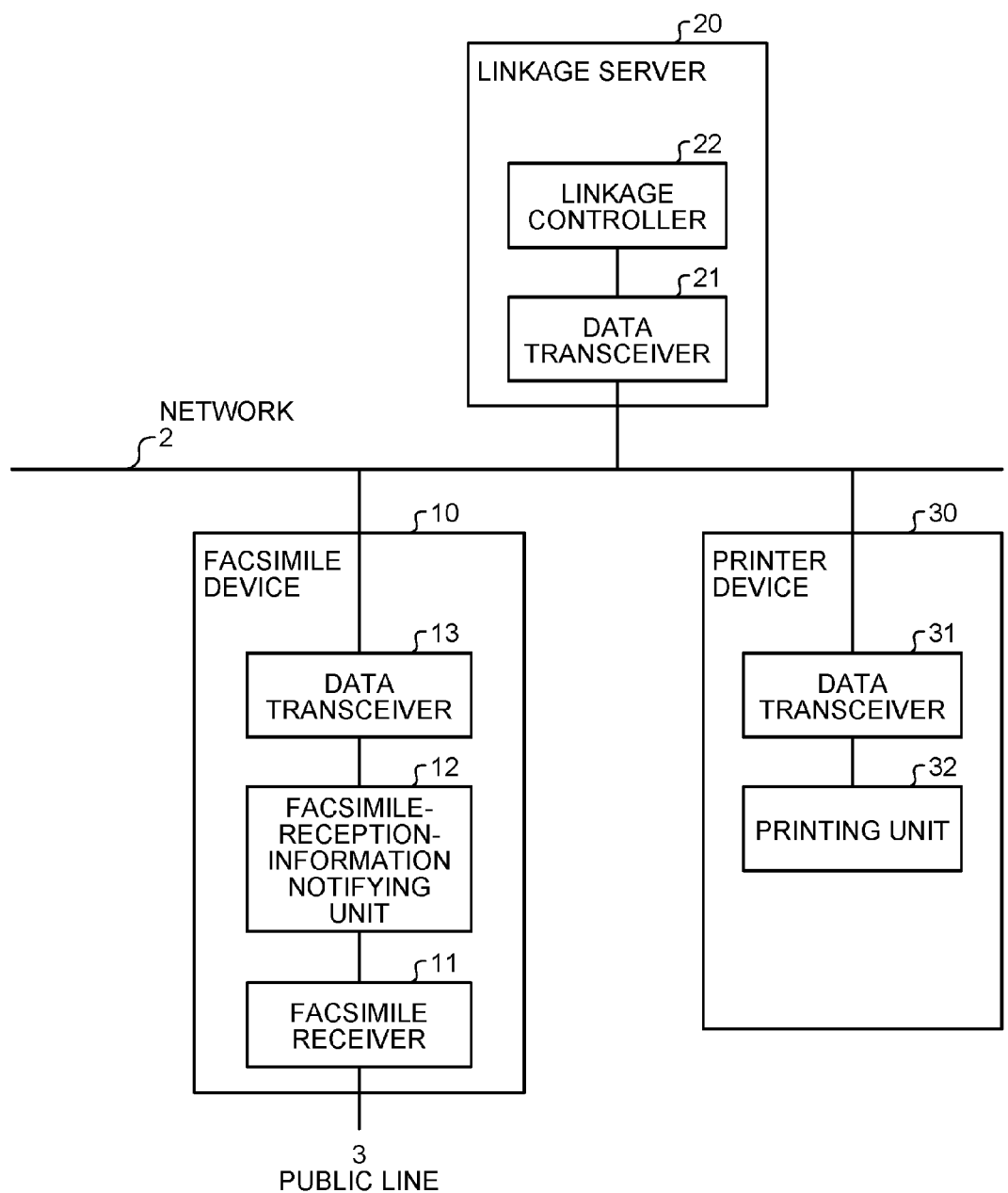
FIG. 3 is a block diagram showing one example of a functional configuration of the facsimile device, the linkage server, and the printer device according to the first embodiment.

FIG. 3 is a block diagram illustrating one example of a functional configuration of the facsimile device 10, the linkage server 20, and the printer device 30 according to the first embodiment.

As illustrated in FIG. 3, the facsimile device 10 includes a facsimile receiver 11, a facsimile-reception-information notifying unit 12, and a data transceiver 13.

The facsimile receiver 11 receives a facsimile document through the public line 3. The facsimile receiver 11 can be implemented, for example, by the facsimile transceiving module 109.

The facsimile-reception-information notifying unit 12 transmits facsimile reception information to the linkage server 20. The facsimile-reception-information notifying unit 12 can be implemented, for example, by the CPU 102, the ROM 103, and the RAM 104.

The data transceiver 13 transmits and receives data between the facsimile device 10 and the linkage server 20 through the network 2. The data transceiver 13 can be implemented, for example, by the NIC 107.

Moreover, as illustrated in FIG. 3, the linkage server 20 includes a data transceiver 21, and a linkage controller 22.

The data transceiver 21 transmits and receives data between the linkage server 20 and the facsimile device 10 through the network 2. Furthermore, the data transceiver 21 transmits and receives data between the linkage server 20 and the printer device 30 through the network 2. The data transceiver 21 can be implemented, for example, by the NIC 207.

The linkage controller 22 controls linkage of the facsimile device 10 and the printer device 30. That is, the linkage controller 22 transmits a print request to the printer device 30 based on facsimile reception information transmitted from the facsimile device 10. The linkage controller 22 can be implemented, for example, by the CPU 202, the ROM 203, and the RAM 204.

Furthermore, the linkage controller 22 selects a printer device to print a facsimile document from among the multiple printer devices 30 (30_1 to 30_n) based on the facsimile reception information. By selecting a printer device based on the facsimile reception information by the linkage controller 22, it is possible to cause a printer device of a user to print only a facsimile document necessary for the user that manages the printer device.

For example, the linkage controller 22 selects a printer device based on counterpart information. Thus, the linkage controller 22 can cause the selected printer device to print only a facsimile document that is received from a specific counterpart.

Moreover, for example, the linkage controller 22 selects a printer device based on line information of a line used by the facsimile device 10 for reception. Thus, the linkage controller 22 can cause the selected printer device to print only a facsimile document received from a specific line.

Furthermore, for example, the linkage controller 22 selects a printer device based on a dial-in number. Thus, the linkage controller 22 can cause the selected printer to print only a facsimile document received from a specific dial-in number.

Moreover, as illustrated in FIG. 3, the printer device 30 includes a data transceiver 31 and a printing unit 32.

The data transceiver 31 transmits and receives data between the printer device 30 and the linkage server 20 through the network 2. The data transceiver 31 can be implemented, for example, by the NIC 307.

The printing unit 32 prints a facsimile document received by the facsimile receiver 11 based on a print request. The printing unit 32 can be implemented, for example, by the printing unit 308.

Figure 4:
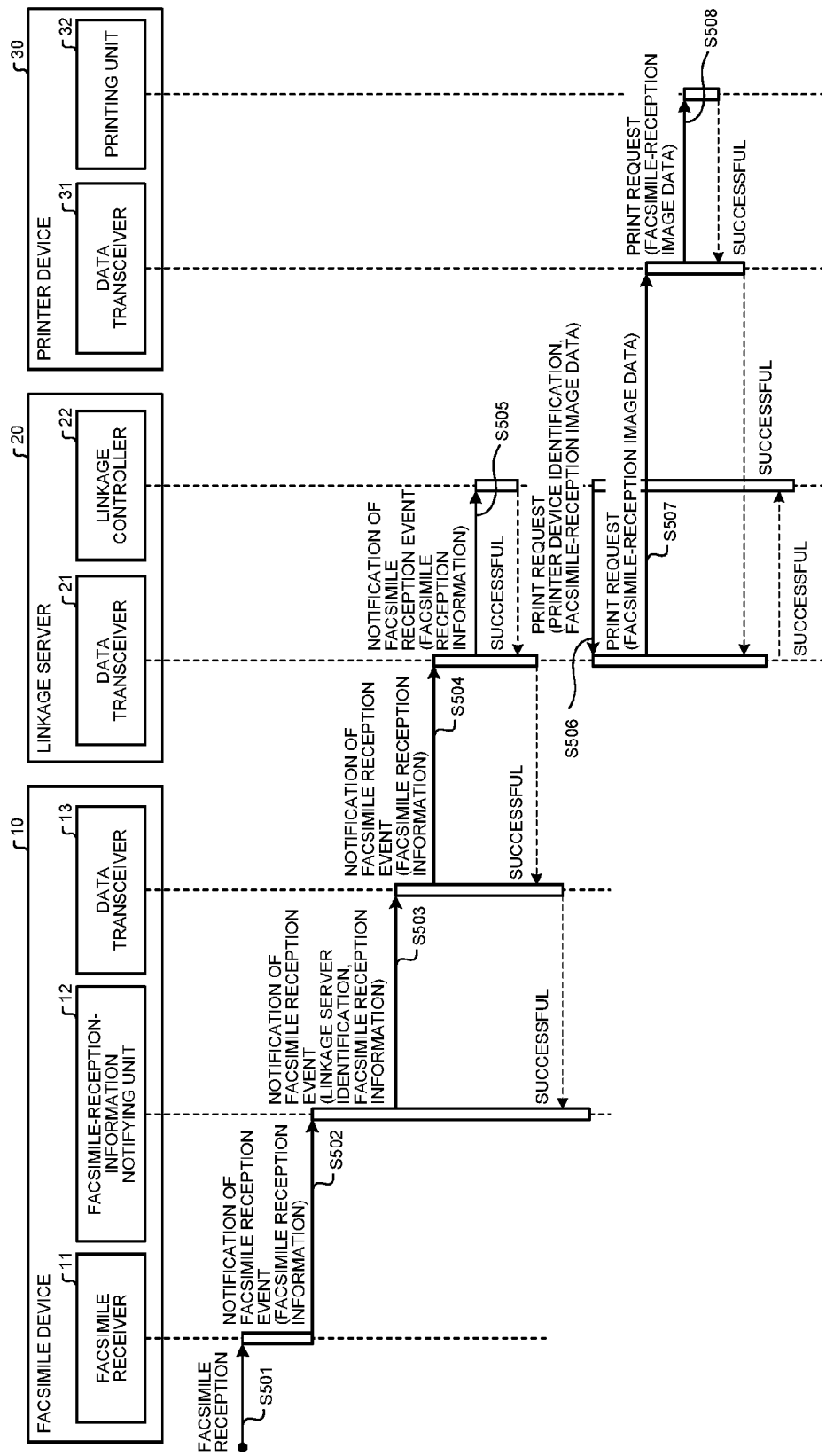
FIG. 4 is a sequence diagram for explaining one example of a processing procedure performed in the linkage system according to the first embodiment.

Next, linkage processing according to the present embodiment configured as above is explained. FIG. 4 is a sequence diagram for explaining one example of a processing procedure performed in the linkage system according to the first embodiment.

First, in the facsimile device 10, the facsimile receiver 11 receives a facsimile document through the public line 3 (step S501).

Subsequently, the facsimile receiver 11 informs the facsimile-reception-information notifying unit 12 of a facsimile reception event that indicates that the facsimile document has been received. At that time, the facsimile receiver 11 transmits facsimile reception information to the facsimile-reception-information notifying unit 12 (step S502). The facsimile reception event is an event indicating that the facsimile receiver has received a facsimile document. Moreover, the facsimile reception information is information about a facsimile, and includes, for example, a facsimile document ID, a time of reception, the number of sheets received, a source name, counterpart information, line information, a dial-in number, and the like. Table 1 is one example of a table indicating the facsimile reception information, and the table is stored in, for example, a storage unit inside the facsimile device. Furthermore, the facsimile document ID is an ID to identify a facsimile document.

TABLE 1

| Facsimile document ID | Time of reception | Number of sheets received | Source name | Counterpart information | Line information | Dial-in number | ... |
|---|---|---|---|---|---|---|---|

Subsequently, the facsimile-reception-information. notifying unit 12 transmits the facsimile reception event to the data transceiver 13 together with the facsimile reception information including the facsimile document, specifying linkage server identification (step S503). The linkage server identification is information to identify a linkage server, and corresponds to an IP address, a media access control (MAC) address, or the like of a linkage server, but are not limited to these. The data transceiver 13 transmits the facsimile reception event to the linkage server 20 specified by the linkage server identification, together with the received facsimile reception information (step S504).

In the linkage server 20, the data transceiver 21 receives the facsimile reception event together with the facsimile reception information. The data transceiver 21 transmits the facsimile reception event to the linkage controller 22 together with the facsimile reception information (step S505). Thereafter, reception-completion notifying message is transmitted from the linkage controller 22 of the linkage server 20 to the data transceiver 21, from the data transceiver 21 of the linkage server 20 to the data transceiver 13 of the facsimile device 10, and from the data transceiver 13 to the facsimile-reception-information notifying unit 12. The reception-completion notifying message is a message indicating successful completion.

Subsequently, the linkage controller 22 extracts facsimile-reception image data included in the facsimile reception information, and transmits a print request in which the extracted facsimile-reception image data and printer device identification of the selected printer device 30 are specified, to the data transceiver 21 (step S506). The data transceiver 21 transmits the received print request of the facsimile-reception image data to the printer device 30 specified by the printer device identification (step S507). The printer device identification is information to identify a printer device, and corresponds, for example, to an IP address, a MAC address, or the like of a printer device, but are not limited to these. Selection of a printer device is performed, as described above based on the facsimile reception information. The linkage controller 22 can also select a printer device that is determined in advance.

In the printer device 30, the data transceiver 31 receives the print request transmitted from the linkage server 20. The data transceiver 31 then transmits the print request to the printing unit 32 together with the facsimile-reception image data (step S508), and the printing unit 32 that has received the print request prints the facsimile-reception image data received together with the print request. Thereafter, when printing is successful, the reception-completion notifying message is transmitted from the printing unit 32 to the data transceiver 31, the data transceiver 21 and to the linkage controller 22 of the linkage server 20.

Thus, the processing performed in the linkage system according to the present embodiment is completed.

As described above, according to the linkage system 1 according to the present embodiment, the linkage server 20 links the facsimile device 10 and the printer device 30, thereby enabling to the printer device 30 without a facsimile function to print a facsimile document that is received by the facsimile device 10. Thus, devices linkable to the facsimile device 10 can be increased, and the installation cost at the time of environment construction can be reduced.

Second Embodiment

In a second embodiment, recovery processing is performed on a facsimile device side when facsimile reception event is not transmitted to a linkage server from a facsimile device due to a system error of the facsimile device at the time of printing a document received by the facsimile device with a printer device. In the following, a point different from the first embodiment is mainly explained, and the same names and reference symbols are assigned to components having similar functions as those of the first embodiment, and the explanation thereof is omitted.

Figure 5:
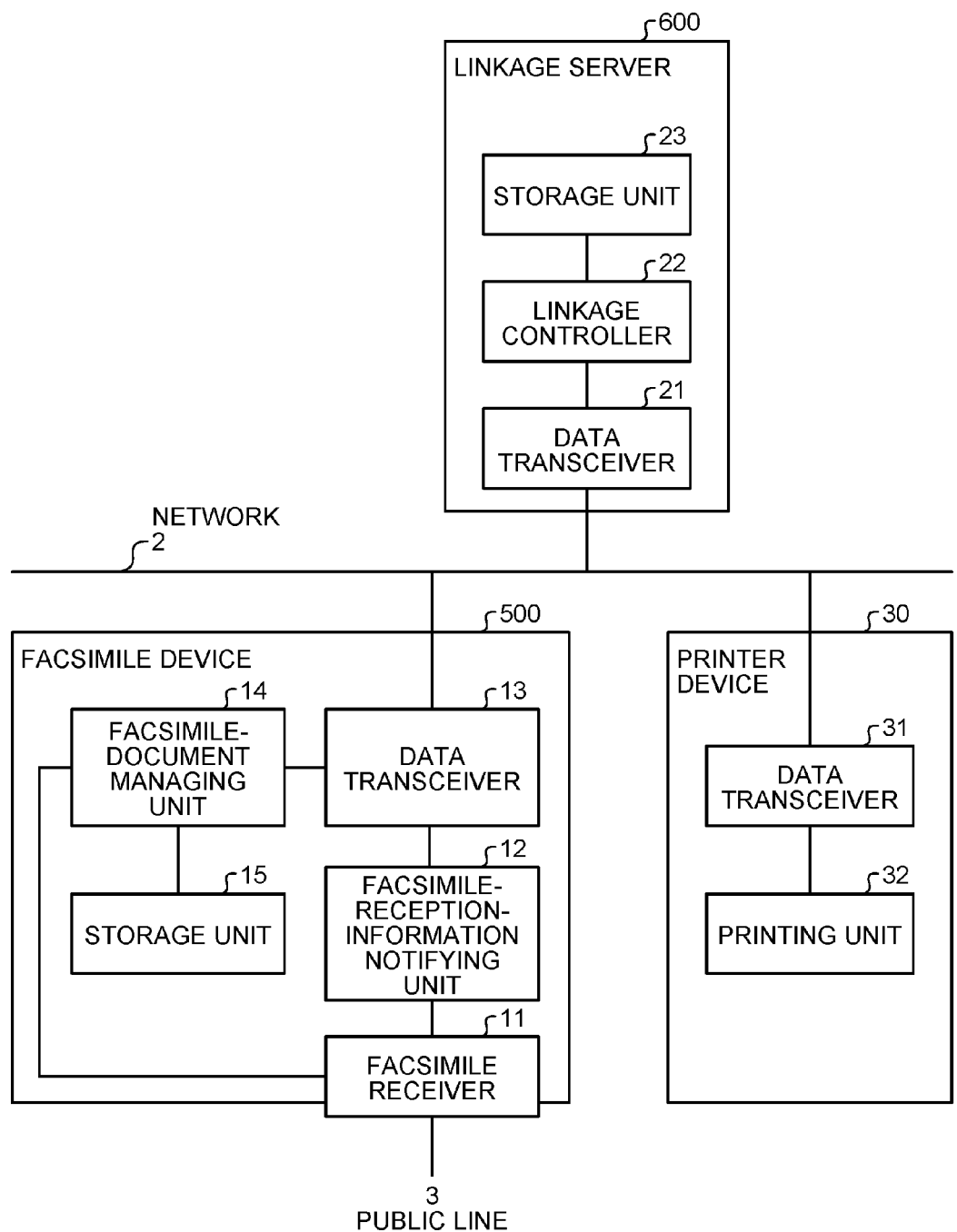
FIG. 5 is a block diagram showing one example of a functional configuration of a facsimile device, a linkage server, and a printer device according to a second embodiment.

FIG. 5 is a block diagram illustrating one example of a configuration of a linkage system, and a functional configuration of a facsimile device 500, a linkage server 600, and the printer device 30 according to the second embodiment. The linkage system of the second embodiment has a structure in which the facsimile device 500, the linkage server 600, and the printer device 30 are connected to each other through the network 2 as illustrated in FIG. 5. The configuration of the printer device 30 is the same as that of the first embodiment.

As illustrated in FIG. 5, the facsimile device 500 includes the facsimile receiver 11, the facsimile-reception-information notifying unit 12, the data transceiver 13, a facsimile-document managing unit 14, and a storage unit 15. The functions and configurations of the facsimile receiver 11, the facsimile-reception-information notifying unit 12, and the data transceiver 13 are the same as those of the first embodiment.

The facsimile-document managing unit 14 manages a facsimile document received by the facsimile receiver 11. The facsimile-document managing unit 14 is connected to the data transceiver 13 and the storage unit 15, and can be implemented, for example, by the CPU 102, the ROM 103, and the RAM 104.

For example, the facsimile-document managing unit 14 acquires facsimile reception information from the storage unit 15 in response to a facsimile-document-list (all facsimile documents received by the facsimile receiver 11) acquisition request from the linkage controller 22 of the linkage server 600, and creates a facsimile document list to respond to the linkage controller 22. Moreover, for example, the facsimile-document managing unit 14 acquires uninformed (unsent) facsimile-reception information (facsimile reception information that has not be informed to the facsimile-reception-information notifying unit 12) from the storage unit 15 in response to a facsimile-ID acquisition request from the linkage controller 22, to respond to the linkage controller 22.

Furthermore, for example, the facsimile-document managing unit 14 acquires facsimile reception information from the storage unit 15 in response to a facsimile-document-list acquisition request from the facsimile-reception-information notifying unit 12, and creates a facsimile document list, to respond to the facsimile-reception-information notifying unit 12. Moreover, the facsimile-document managing unit 14 acquires uninformed facsimile-reception information from the storage unit 15 in response to a facsimile-ID acquisition request from the facsimile-reception-information notifying unit 12, to respond to the facsimile-reception-information notifying unit 12.

The storage unit 15 stores facsimile reception information, informed facsimile-reception information (facsimile reception information that has already been informed to the facsimile-reception-information notifying unit 12), data necessary for various kinds of processing, and the like. The storage unit 15 is connected to the facsimile-document managing unit 14, and can be implemented, for example, by the HDD 106.

The linkage server 600 includes the data transceiver 21, the linkage controller 22, and a storage unit 23. The data transceiver 21 and the linkage controller 22 are the same as those of the first embodiment. The storage unit 23 stores facsimile reception information, informed facsimile-reception information, data necessary for various kinds of processing, and the like. The storage unit 23 can be implemented, for example, by the HDD 206.

Figure 6:
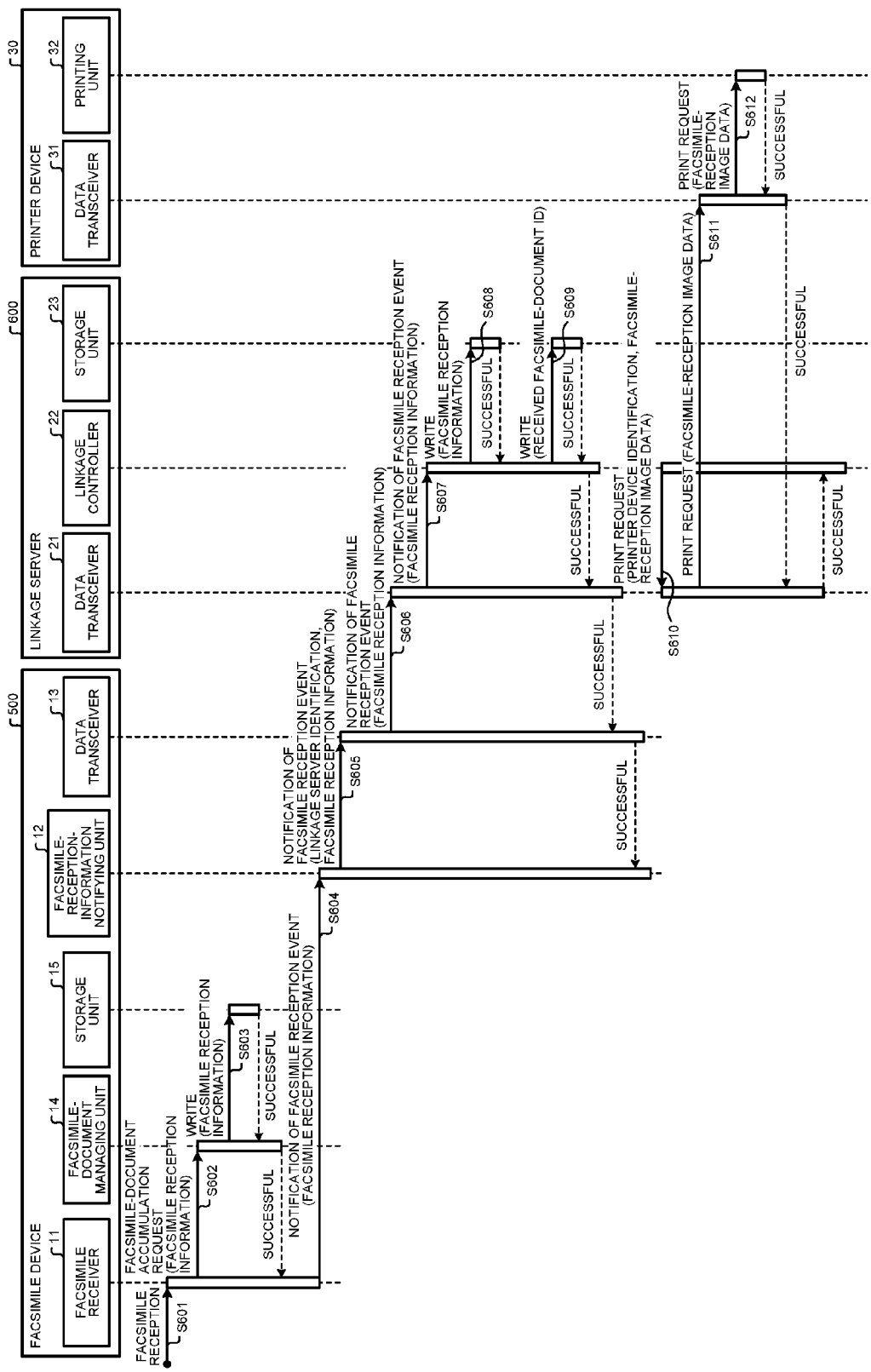
FIG. 6 is a sequence diagram for explaining one example of a processing procedure performed in a linkage system according to the second embodiment.
Figure 7:
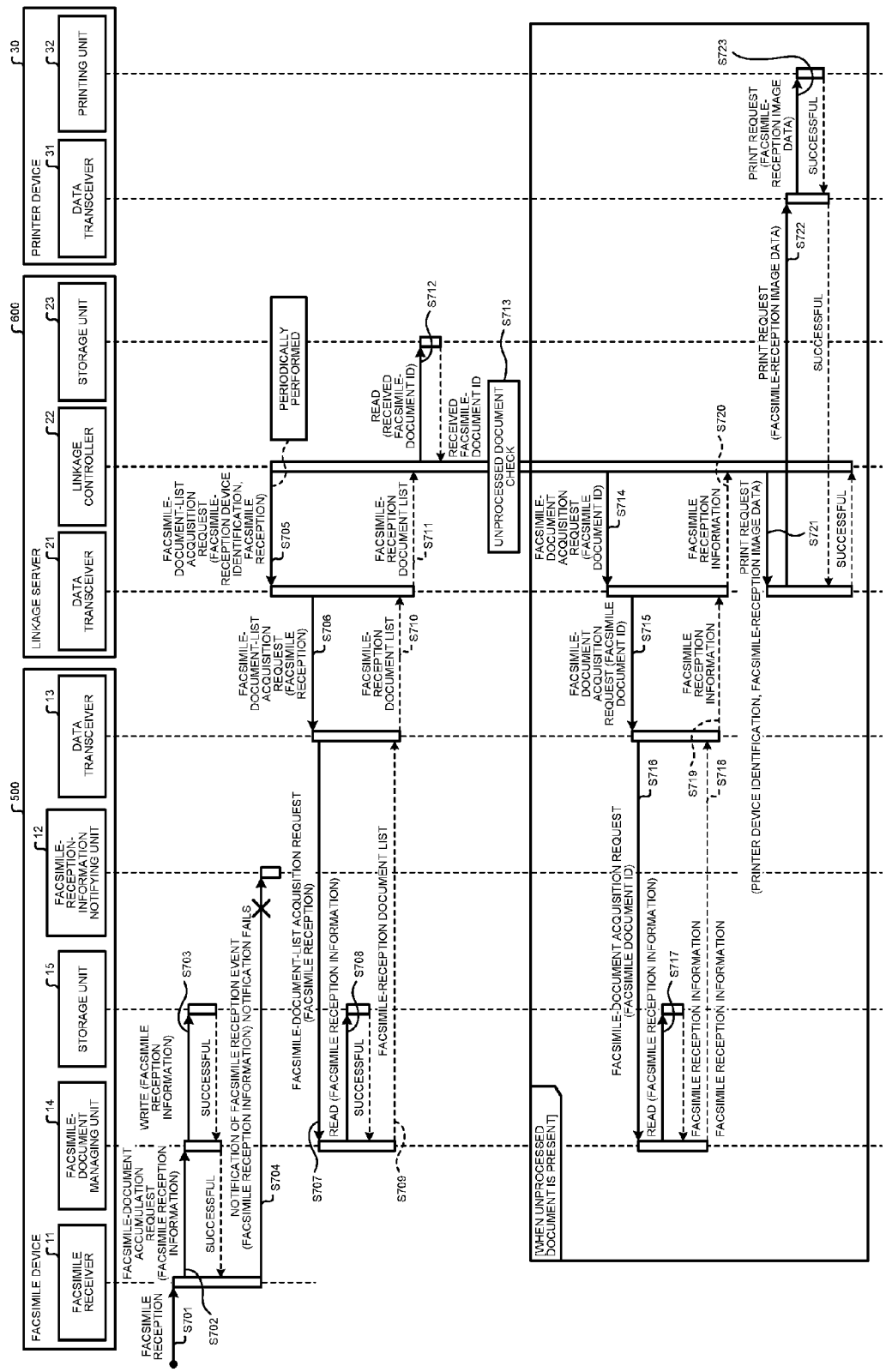
FIG. 7 is a sequence diagram for explaining one example of a processing procedure performed in the linkage system according to the second embodiment.

Next, linkage processing according to the present embodiment configured as above is explained. FIG. 6 is a sequence diagram for explaining one example of a processing procedure performed in the linkage system according to the second embodiment. In FIG. 6, a case in which facsimile reception information is normally informed to the facsimile-reception-information notifying unit 12 as a precondition of explanation about the recovery processing performed by the linkage server 20 illustrated in FIG. 7 is explained. Note that prior to the processing illustrated in FIG. 7, the processing illustrated in FIG. 6 is performed.

First, in the facsimile device 500, the facsimile receiver 11 receives a facsimile document through the public line 3 (step S601).

Subsequently, the facsimile receiver 11 transmits a facsimile-document accumulation request to the facsimile-document managing unit 14 together with facsimile reception information (step S602), and the facsimile-document managing unit 14 that has received the facsimile-document accumulation request writes the facsimile reception information in the storage unit to be stored therein (step S603). When the write is normally done, the storage unit 15 transmits a response indicating the successful writing to the facsimile-document managing unit 14, and the facsimile-document managing unit 14 transmits reception-completion notifying message to the facsimile receiver 11.

Subsequently, the facsimile receiver 11 transmits a facsimile reception event indicating that the facsimile document is received to the facsimile-reception-information notifying unit 12 (step S604). At that time, the facsimile receiver 11 transmits the facsimile reception information to the facsimile-reception-information notifying unit 12.

Subsequently, facsimile-reception-information notifying unit 12 transmits the facsimile reception event together with the facsimile reception information to the data transceiver 13, specifying a linkage server identification of the linkage server 600 (step S605). The data transceiver 13 transmits the facsimile reception event together with the facsimile reception information to the linkage server 600 specified by the linkage server identification (step S606).

In the linkage server 600, the data transceiver 21 transmits the facsimile reception event together with the facsimile reception information. The data transceiver 21 transmits the facsimile reception event together with the facsimile reception information received from the facsimile device 10, to the linkage controller 22 (step S607). The linkage controller 22 writes the facsimile reception information in the storage unit 23 (step S608), to have the facsimile reception information stored. When write is successful, a response indicating successful is transmitted from the storage unit 23 to the linkage controller 22.

Subsequently, the linkage controller 22 writes the facsimile document ID (that is, the facsimile document ID that has already been informed to the facsimile-reception-information notifying unit 12) out of the informed facsimile reception information in the storage unit 23 as received facsimile-document ID to be stored therein (step S609). When the write is successful, a response indicating the success is transmitted to the linkage controller 22 from the storage unit 23, and to the data transceiver 21 from the linkage controller 22, and further to the data transceiver 13 and the facsimile-reception-information notifying unit 12 of the facsimile device 500 from the linkage server 600.

When storing received facsimile-document ID (facsimile document ID that has already been informed to the facsimile-reception-information notifying unit 12) in the storage unit 23, the linkage controller 22 can store facsimile document ID that has been informed to the facsimile-reception-information notifying unit 12 prior to a predetermined data and time, as the received facsimile-document ID.

For example, when the predetermined date and time is the time when the linkage system in installed, a facsimile document ID that is informed to the facsimile-reception-information notifying unit 12 before installation of the linkage system is the received facsimile-document ID. In this case, the linkage system can exclude a facsimile document received by the facsimile device 500 before the installation of the linkage system from a subject of printing.

Subsequently, the linkage controller 22 extracts facsimile-reception image data included in the facsimile reception information, and transmits the extracted facsimile-reception image data and a print request specifying a printer device identification of a desired printer device to the data transceiver 21 (step S610). The data transceiver 21 transmits the print request of the facsimile-reception image data to the printer device 30 specified by the printer device identification (step S611).

In the printer device 30, the data transceiver 31 receives the print request transmitted from the linkage server 600. The data transceiver 31 then transmits the print request together with the facsimile-reception image data to the printing unit 32 (step S612), and the printing unit 32 that has received the print request prints the facsimile-reception image data received with the print request. Thereafter, when printing is successful, a reception completion notifying message is transmitted from the printing unit 32 to the data transceiver 31, the data transceiver 21, and the linkage controller 22 of the linkage server 600.

As described above, normal processing is completed in the linkage system according to the present embodiment.

Next, recovery processing when a facsimile reception event is not transmitted to the linkage server from the facsimile device due to a system error is explained. FIG. 7 is a sequence diagram for explaining one example of a processing procedure performed when an error occurs in the linkage processing in the linkage system according to the second embodiment. In FIG. 7, a case in which a facsimile reception information is not informed to the facsimile-reception-information notifying unit 12 normally due to a system error of the facsimile device 500 and recovery processing is performed by the linkage server 600 is explained.

Processing from reception of a facsimile until write of facsimile reception information (steps S701 to S703) is normally performed, similarly to steps S601 to S603 in FIG. 6.

Subsequently, the facsimile receiver 11 performs event notification (transmission) for the facsimile reception information to the facsimile-reception-information notifying unit 12. However, the event notification is unsuccessful due to a system error of the facsimile device 500 (step S704). In this case, notification of the facsimile reception event to the linkage server 600 is not performed, and the processing is ended. Therefore, the linkage server 600 cannot be aware of the facsimile reception.

Accordingly, in the linkage server 600, the linkage controller 22 requests acquisition of a facsimile document list periodically (for example, every one hour, every twenty-four hours, or the like) to the facsimile device 500. Specifically, the linkage controller 22 of the linkage server 600 transmits facsimile device identification and a facsimile-document-list acquisition request of facsimile documents specifying facsimile reception, to the data transceiver 21 (step S705). The facsimile device identification is information to identify a facsimile device, and is specified in the facsimile-document-list acquisition request to identify the facsimile device 500 from which a list is acquired. The facsimile reception is designated in the facsimile-document-list acquisition request when a list of documents received by facsimile is requested. Note that when a list of documents transmitted by facsimile is requested, facsimile transmission is specified in the facsimile-document-list acquisition request.

The data transceiver 21 transmits the facsimile-document-list acquisition request to the facsimile device 500 corresponding to the specified facsimile device identification (step S706).

In the facsimile device 500, the data transceiver 13 receives the facsimile-document-list acquisition request transmitted from the linkage server 600. The data transceiver 13 transmits the received facsimile-document-list acquisition request to the facsimile-document managing unit 14 (step S707). Receiving the facsimile-document-list acquisition request, the facsimile-document managing unit 14 reads all of the facsimile reception information stored in the storage unit 15 (step S708). When read is successful, a response indicating successful is returned to the storage unit 15. The facsimile-document managing unit 14 then creates a facsimile document list from the acquired facsimile reception information, and transmits the created facsimile document list to the data transceiver 13 (step S709), and the data transceiver 13 transmits the facsimile document list to the linkage server 600 (step S710).

In the linkage server 600, the data transceiver 21 receives the facsimile document list, and transfers to the linkage controller 22 (step S711). The linkage controller 22 reads received facsimile-reception information stored in the storage unit 23 (step S712). Thus, the received facsimile-reception information including the facsimile document ID is read.

Subsequently, the linkage controller 22 compares the facsimile document list with the received facsimile-reception information, and performs unprocessed document check to determine whether the facsimile document ID included in the facsimile document list and the facsimile document ID of the received facsimile-reception information coincide with each other (step S713).

When determining that the facsimile document ID included in the facsimile document list and the facsimile document ID of the received facsimile-reception information coincide with each other, in other words, when determining that the facsimile reception information is normally informed to the facsimile-reception-information notifying unit 12, the linkage controller 22 does not perform the recovery processing. On the other hand, when determining that the facsimile document ID included in the facsimile document list and the facsimile document ID included in the received facsimile-reception information do not coincide with each other, the linkage controller 22 determines that the facsimile reception information has not been informed to the facsimile-reception-information notifying unit 12 normally, and performs the recovery processing.

This recovery processing is performed as follows. First, when determining that the facsimile reception information is not informed to the facsimile-reception-information notifying unit 12 normally, the linkage controller 22 transmits a facsimile-document acquisition request specifying the facsimile document ID that is included in not-received facsimile reception information, to the data transceiver 21 (step S714). The data transceiver 21 transmits the facsimile-document acquisition request to the facsimile device 500 (step S715).

In the facsimile device 500, the data transceiver 13 receives the facsimile-document-list acquisition request, and transmits the received facsimile-document-list acquisition request to the facsimile-document managing unit (step S716). Receiving the facsimile-document-list acquisition request, the facsimile-document managing unit 14 reads the facsimile reception information corresponding to all of the facsimile document IDs specified in the facsimile-document-list acquisition request from the storage unit 15 (step S717), and the facsimile-document managing unit 14 transmits the uninformed facsimile-reception information to the data transceiver 13 (step S718). The data transceiver 13 transmits all the uninformed facsimile-reception information to the linkage server 600 (step S719).

In the linkage server 600, the data transceiver 21 receives the uninformed facsimile reception information, and transfers to the linkage controller 22 (step S720). The linkage controller 22 extracts facsimile-reception image data included in the uninformed facsimile reception information, and transmits a print request of the facsimile-reception image data specifying the printer device identification of the printer device 30 that is selected based on the facsimile reception information, to the data transceiver 21 (step S721). The data transceiver 21 transmits the print request of the facsimile-reception image data to the printing unit 32 specified by the printer device identification (step S722).

In the printer device 30, the data transceiver 31 receives the print request, and transfers to the printing unit 32 (step S723). The printing unit 32 that has received the print request prints the facsimile-reception image data. When printing is completed, a reception-completion notifying message is transmitted to the linkage server 600 through the data transceiver 31 from the printing unit 32. In the linkage server 600, the data transceiver 21 receives the reception-completion notifying message, to notify the linkage controller 22.

As described above, the linkage controller 22 of the linkage server 600 acquires the uninformed facsimile reception information based on the received facsimile-document ID, and performs the error recovery.

Modification

Figure 8:
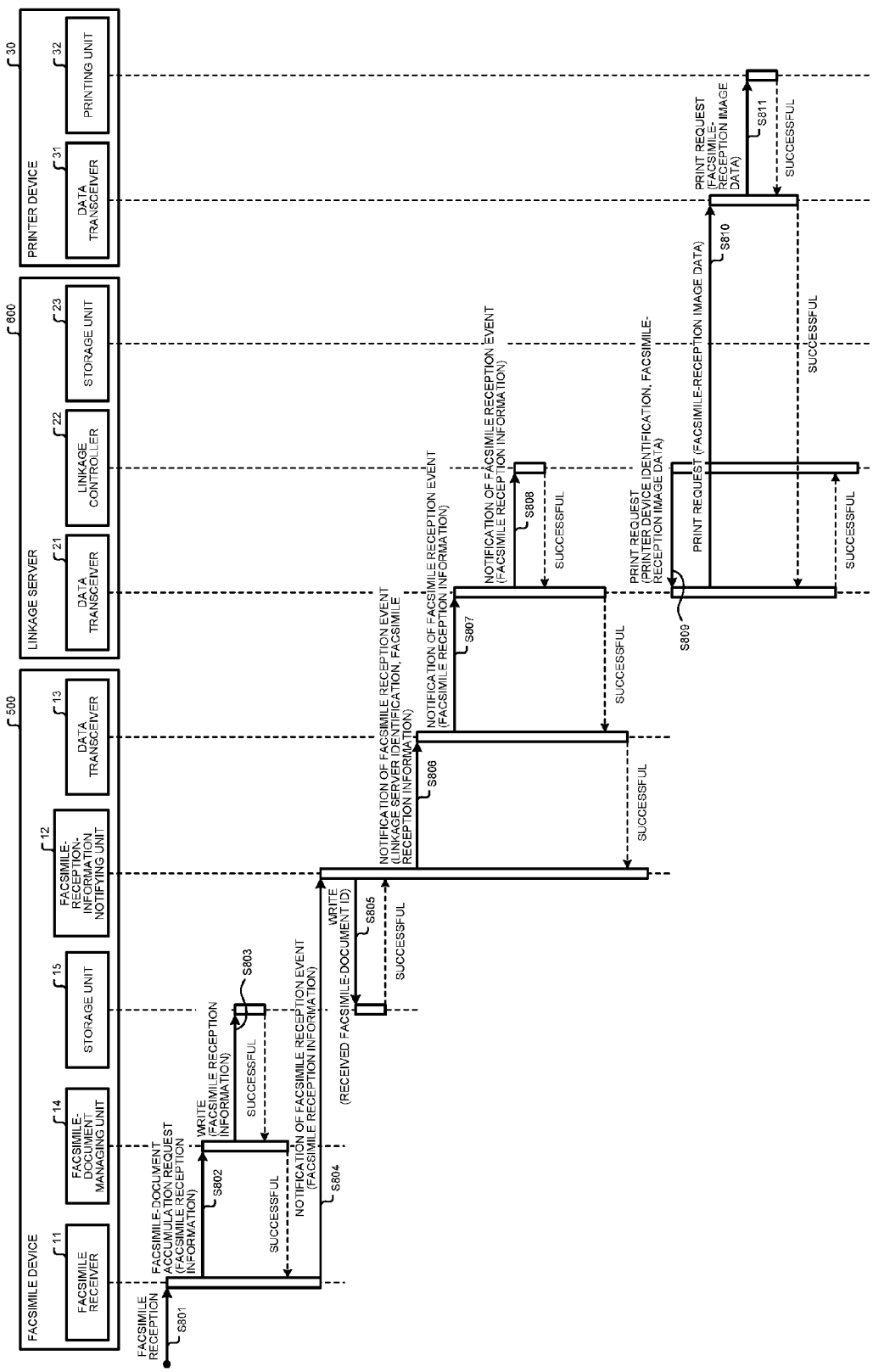
FIG. 8 is a sequence diagram for explaining one example of a processing procedure performed in the linkage system according to the second embodiment.
Figure 9:
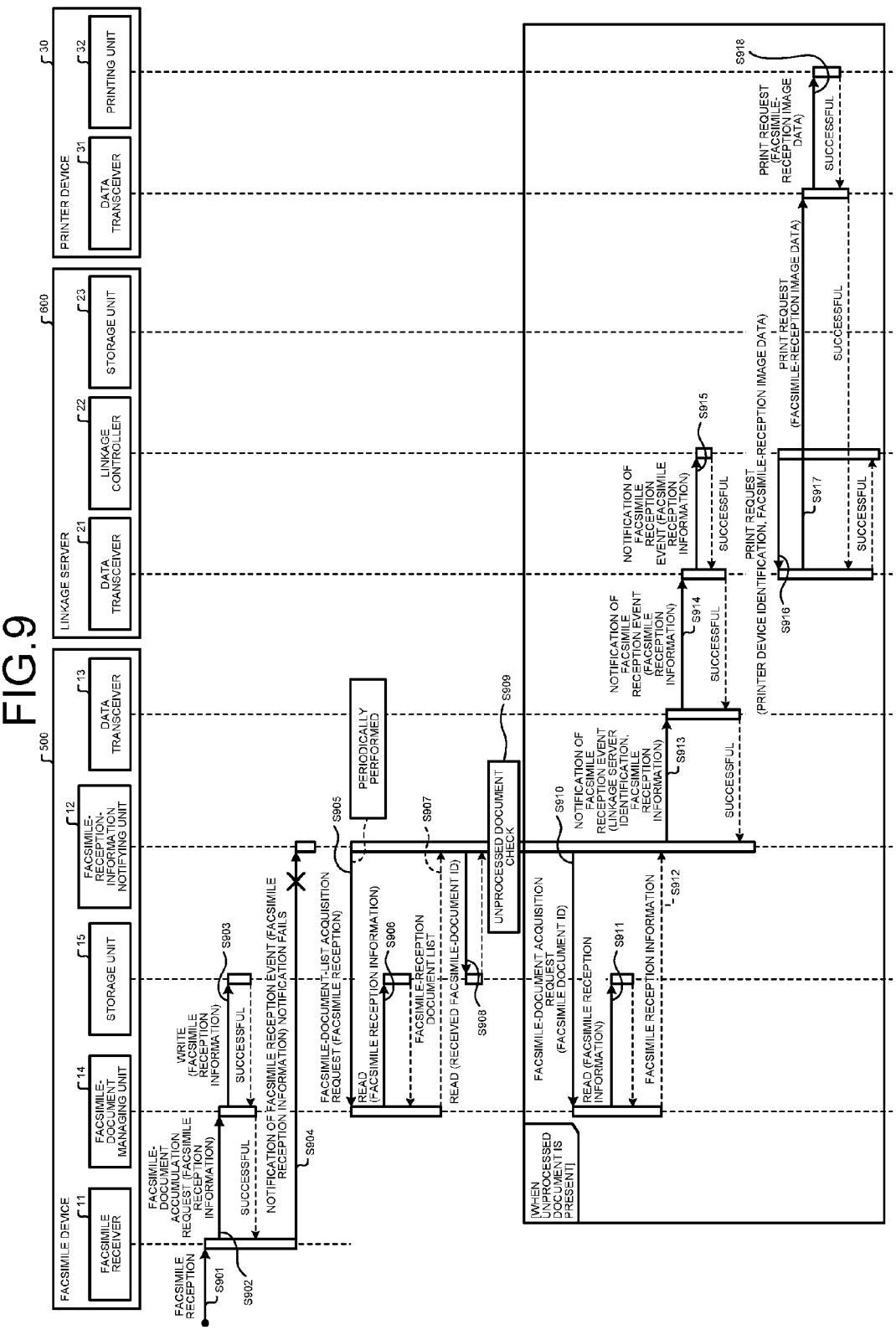
FIG. 9 is a sequence diagram for explaining one example of a processing procedure performed in the linkage system according to the second embodiment.

Although the recovery processing has been performed by the linkage server 600 in the second embodiment, it may be configured to perform the recovery processing by the facsimile device 500. FIG. 8 is a sequence diagram for explaining one example of a processing procedure performed in the linkage system according to a modification of the second embodiment. In FIG. 8, a case in which facsimile reception information is normally informed to the facsimile-reception-information notifying unit 12 as a precondition of explanation of the recovery processing performed by the facsimile device 10 illustrated in FIG. 9 is explained.

Processing from reception of a facsimile until notification of a facsimile reception event to the facsimile-reception-information notifying unit 12 (steps S801 to S804) is normally performed, similarly to processing at steps S601 to S604 in FIG. 6 of the second embodiment.

In the present modification, the facsimile-reception-information notifying unit 12 to which facsimile reception event has been informed stores a facsimile document ID (that is, a facsimile document ID that has already been informed to the facsimile-reception-information notifying unit 12) out of the informed facsimile-reception information in the storage unit 15, as a received facsimile-document ID (step S805), unlike the second embodiment.

When storing received facsimile-document ID (a facsimile document ID that has already been informed to the facsimile-reception-information notifying unit 12) in the storage unit 15, the facsimile-reception-information notifying unit 12 can store a facsimile document ID that has been informed to the facsimile-reception-information notifying unit 12 prior to a predetermined data and time as received facsimile-document ID.

For example, the predetermined data and time is the time when the linkage system is installed, a facsimile document ID informed to the facsimile-reception-information notifying unit 12 before the installation of the linkage system is the received facsimile-document ID. In this case, the linkage system can exclude a facsimile document that has been received by the facsimile device 500 before the installation of the linkage system from a subject to be printed.

Processing of informing a facsimile reception event to the linkage server 600 (steps S806 to S808) is performed similarly to the processing at steps S605 to S607 in FIG. 6. In the present modification, unlike the second embodiment, writing of a facsimile document ID has been performed at step S805 in the facsimile device 500, and therefore, no such processing is performed in the linkage server 600.

Processing from requesting print until printing (steps S809 to S811) is performed similarly to the processing at steps S610 to S612 in FIG. 6 of the second embodiment.

Next, recovery processing when a facsimile reception event is not informed to a linkage server from a facsimile device due to a system error is explained. FIG. 9 is a sequence diagram for explaining one example of a processing procedure performed when an error occurs in the linkage processing performed in the linkage system according to the second embodiment. In FIG. 9, a case in which facsimile reception information is not normally informed to the facsimile-reception-information notifying unit 12 due to a system error, and the facsimile device 500 performs recovery processing is explained. Note that prior to the processing illustrated in FIG. 9, the processing illustrated in FIG. 8 has been performed.

Processing from facsimile reception until notification of a facsimile reception event to the facsimile-reception-information notifying unit 12 (steps S901 to S904) is performed similarly to the processing at steps S801 to S804 in FIG. 8.

Suppose that event notification is unsuccessful due to a system error of the facsimile device 500 at notification of a facsimile reception event to the facsimile-reception-information notifying unit 12 at step S904. In this case, the processing is ended, and the linkage server 600 cannot be aware of reception of a facsimile.

Therefore, the facsimile-reception-information notifying unit 12 periodically (for example, every one hour, every twenty-four hours, or the like) requests acquisition of a facsimile document list to the facsimile-document managing unit 14 (step S905). In the facsimile-document-list acquisition request, facsimile reception is designated. This is to request a list of documents received by facsimile.

When receiving the facsimile-document-list acquisition request, the facsimile-document managing unit 14 reads to acquire all facsimile reception information stored in the storage unit 15 (step S906). The facsimile-document managing unit 14 then creates a facsimile document list, to transmit to the facsimile-reception-information notifying unit 12 (step S907).

Subsequently, receiving the facsimile document list, the facsimile-reception-information notifying unit 12 acquires a facsimile document ID from the facsimile document list, and reads all received facsimile-reception information stored in the storage unit 15 specifying the acquired facsimile document ID (step S908).

Subsequently, the facsimile-reception-information notifying unit 12 compares the facsimile document list with the received facsimile-reception information, and performs unprocessed document check to determines whether the facsimile document ID included in the facsimile document list and the received facsimile-document ID coincide with each other (step S909).

When determining that the facsimile document ID included in the facsimile document list and the received facsimile-document ID coincide with each other, that is, when determining that the facsimile reception information is normally informed to the facsimile-reception-information notifying unit 12, the facsimile-reception-information notifying unit 12 does not perform the recovery processing. On the other hand, when determining that the facsimile document ID included in the facsimile document list and the received facsimile-document ID do not coincide with each other, that is, when determining that the facsimile reception information is not normally informed to the facsimile-reception-information notifying unit 12, the facsimile-reception-information notifying unit 12 performs the recovery processing.

The facsimile-reception-information notifying unit 12 specifies, when determining that the facsimile reception information is not normally informed to the facsimile-reception-information notifying unit 12, the facsimile document ID of the uninformed facsimile-reception information (that is, the facsimile document ID that has not been informed to the facsimile-reception-information notifying unit 12 yet), and transmits a facsimile-document acquisition request to the facsimile-document managing unit (step S910).

The facsimile-document managing unit 14 that has received the facsimile-document acquisition request acquires uninformed facsimile reception information according to the facsimile document ID specified in the facsimile-document acquisition request, from the storage unit 15 (step S911). The facsimile-document managing unit 14 then transmits the acquired facsimile reception information to the facsimile-reception-information notifying unit 12 (step S912).

Subsequently, the facsimile-reception-information notifying unit 12 transmits the facsimile reception event specifying the linkage server identification and the facsimile reception information to the data transceiver 13 (step S913), and the data transceiver 13 transmits the facsimile reception event to the linkage server 600 specified by the linkage server identification together with the facsimile reception information (step S914).

In the linkage server 600, the data transceiver 21 receives the facsimile reception event, and transfers to the linkage controller 22 (step S915). At this time, a reception-completion notifying message is transmitted from the linkage controller 22 to the data transceiver 21, and to the facsimile device 500. In the facsimile device 500, the data transceiver 13 receives the reception-completion notifying message to be informed to the facsimile-reception-information notifying unit 12.

Thereafter, processing from print request until printing (steps S916 to S918) is performed similarly to the processing at steps S809 to S811 in FIG. 8.

As described, the facsimile-reception-information notifying unit 12 acquires uninformed facsimile-reception information based on a received facsimile-document ID, and transmits the information to the linkage controller 22, thereby performing the recovery.

Therefore, according to the linkage system of the second embodiment and the modification, even when facsimile reception information is not normally transmitted to the linkage server 600 from the facsimile device 500 due to a network error or the like, and the facsimile device 500 and the linkage server 600 shut the power and reboot themselves, it is possible to cause the printer device 30 having no facsimile function to print a facsimile document that is received by the facsimile device 500. Thus, the linkage system can increase devices linkable to the facsimile device 500, and reduce the installation cost at the time of environment construction. Furthermore, the linkage system can reduce the possibility of failure in printing.

Third Embodiment

In a third embodiment, recovery processing is performed when notification of a facsimile reception event to a linkage server from a facsimile device is unsuccessful due to a power cut of the facsimile device, a power cut of the linkage server, a network error, or the like.

In the following, a point different from the first embodiment is mainly explained, and the same names and reference symbols are assigned to components having similar functions as those of the first embodiment, and the explanation thereof is omitted.

Figure 10:
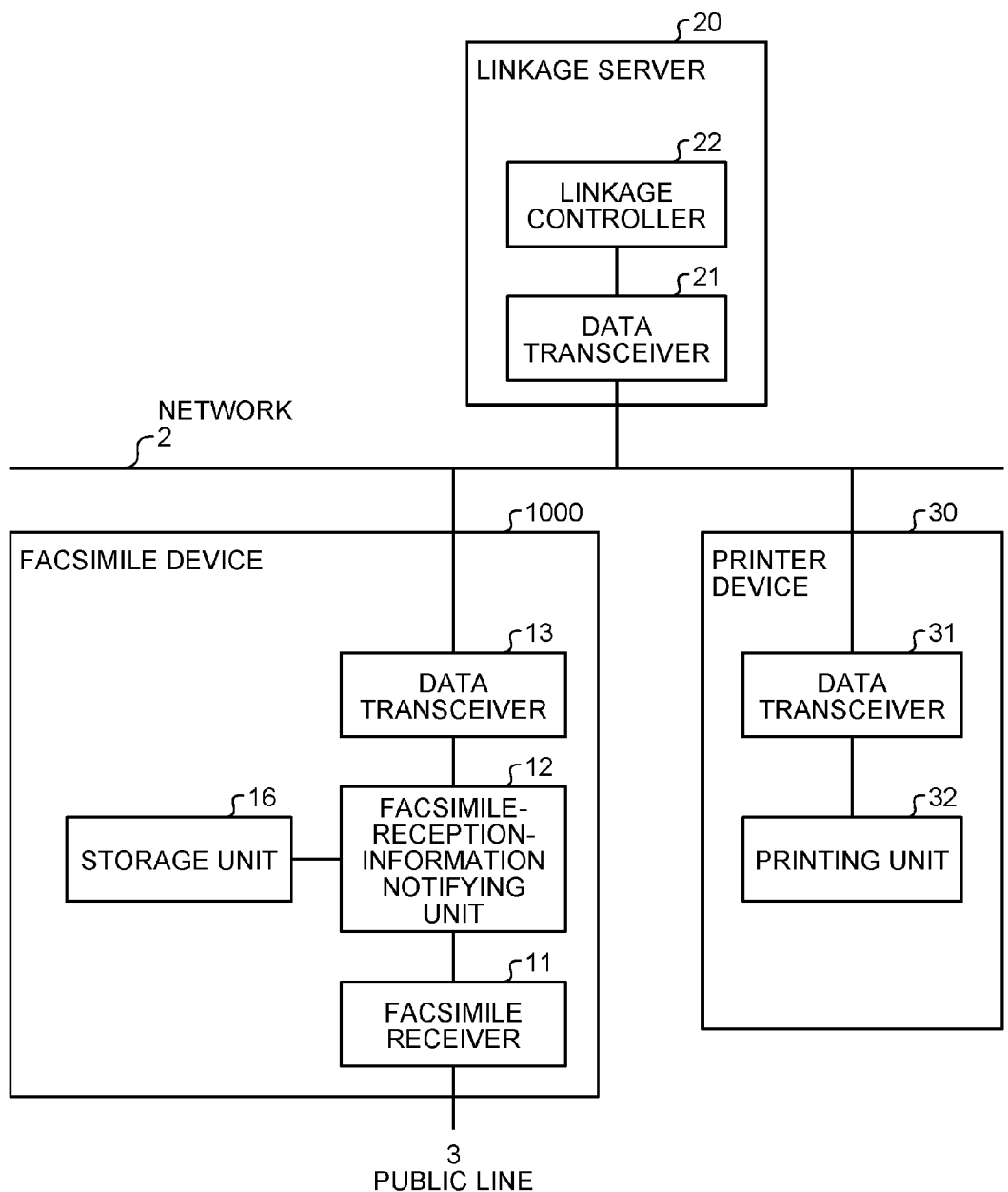
FIG. 10 is a block diagram showing one example of a functional configuration of a facsimile device, a linkage server, and a printer device according to a third embodiment.

FIG. 10 is a block diagram showing one example of a functional configuration of a facsimile device 1000, the linkage server 20, and the printer device 30 according to the third embodiment. The linkage system according to the third embodiment has a configuration which the facsimile device 1000, the linkage server 20, and the printer device 30 are connected through the network 2 as illustrated in FIG. 10. The linkage server 20 and the printer device 30 are the same as those of the first embodiment.

As illustrated in FIG. 10, the facsimile device 1000 includes the facsimile receiver 11, the facsimile-reception-information notifying unit 12, the data transceiver 13, and a storage unit 16. The facsimile receiver 11 and the facsimile-reception-information notifying unit 12 are the same as those of the first embodiment.

The storage unit 16 stores uninformed facsimile-reception information (that is, facsimile reception information that has not been informed to the linkage controller 22), data necessary for various kinds of processing, and the like. The storage unit 16 is connected to the facsimile-reception-information notifying unit 12, and can be implemented, for example, by the HDD 106.

Figure 11:
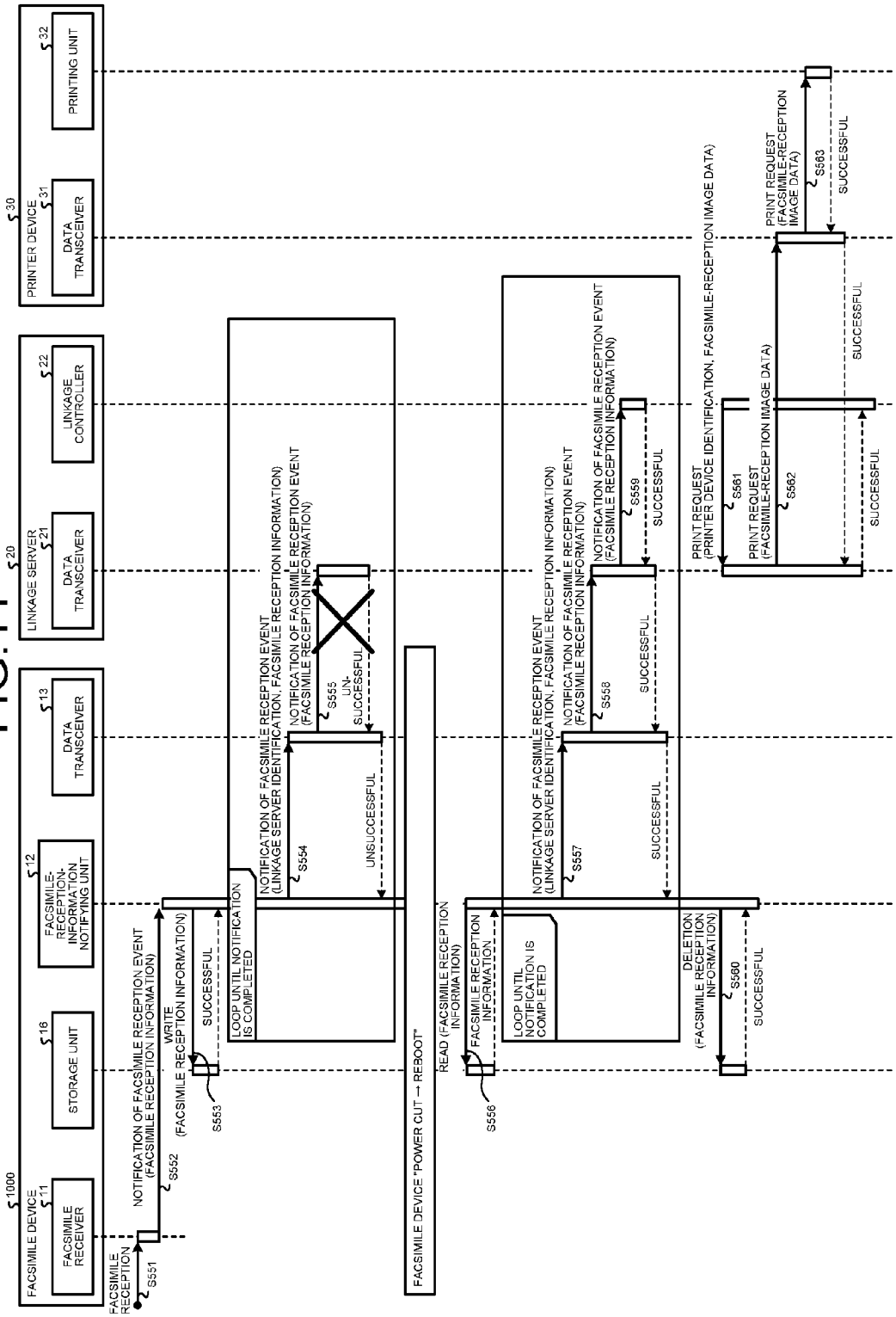
FIG. 11 is a sequence diagram for explaining one example of a processing procedure performed in the linkage system according to the third embodiment.

FIG. 11 is a sequence diagram for explaining one example of a processing procedure performed in the linkage system according to the third embodiment. In FIG. 11, a case in which the facsimile device 1000 shuts the power and facsimile reception information is not normally informed to the linkage controller 22 due to a network error, or the like, and the facsimile device 1000 performs recovery processing is explained.

First, the facsimile receiver 11 of the facsimile device 1000 receives a facsimile document through the public line 3 (step S551). The facsimile receiver 11 transmits a facsimile reception event to the facsimile-reception-information notifying unit 12 together with the facsimile reception information (step S552). The facsimile-reception-information notifying unit 12 then writes the received facsimile reception information into the storage unit 16 to be stored therein (step S553). The facsimile reception information stored in the storage unit 16 is deleted when notification of the facsimile reception event (also transmission of the facsimile reception information is performed) to the linkage server 20 is normally completed. Therefore, when facsimile reception information remains in the storage unit 16, it means that notification of the facsimile reception event to the linkage server 20 is not completed normally.

When write is successful, the facsimile-reception-information notifying unit 12 transmits the facsimile reception event specifying a linkage server identification to the linkage controller 22 together with the facsimile reception information (step S554). Although the facsimile-reception-information notifying unit 12 transmits this facsimile reception event to the linkage server 20 specified by the linkages server identification, the facsimile device 1000 shuts the power due to a network error or the like, and the event notification is unsuccessful (step S555). A reception-incompletion notifying message is sent to the facsimile-reception-information notifying unit 12 from the data transceiver 13 in the facsimile device 1000. The reception-incompletion message is a message indicating unsuccessful. Note that the notification processing of the facsimile reception event to the linkage server 20 at steps S554 and S555 is repeated until the notification to the linkage server 20 is normally completed.

A case in which the facsimile device 1000 shuts the power and reboots itself during the above processing is considered. The facsimile-reception-information notifying unit 12 subsequently determines whether uninformed facsimile-reception information is present in the storage unit 16 after the facsimile device 1000 is rebooted, and when present, reads the corresponding facsimile-reception information (step S556).

The facsimile-reception-information notifying unit 12 performs recovery processing when determining that uninformed facsimile-reception information is present in the storage unit 16, that is, when determining that notification of facsimile reception information (notification of a facsimile reception event) to the linkage server 20 is not normally completed. In this case, the facsimile-reception-information notifying unit 12 transmits a facsimile reception event specifying linkage server identification to the linkage controller 22 together with the facsimile reception information (step S557). The facsimile-reception-information notifying unit 12 transmits this facsimile reception event to the linkage server 20 specified by the linkage server identification (step S558). At this time, the facsimile device 1000 has been rebooted due to a network error, and accordingly, notification of the facsimile reception event to the linkage server is normally performed.

In the linkage server, the data transceiver 21 receives the facsimile reception event, and transfers to the linkage controller 22 (step S559). As the notification is successful, a reception completion notifying message is transmitted from the linkage controller 22 to the data transceiver 21, the data transceiver 13, and the facsimile-reception-information notifying unit 12 of the facsimile device 1000. Receiving the reception-completion notifying message, the facsimile-reception-information notifying unit 12 of the facsimile device 1000 deletes the facsimile reception information stored in the storage unit 16 (step S560).

Processing thereafter from print request until printing (steps S561 to S563) is performed similarly to the processing at steps S506 to S508 in FIG. 4.

As described above, when determining that uninformed facsimile-reception information is present in the storage unit 16, the facsimile-reception-information notifying unit 12 informs the linkage controller 22 of the information, thereby performing error recovery.

As described, according to the linkage system of the present embodiment, even when facsimile reception information is not transmitted to the linkage controller 22 by normal event notification due to a network error, or the like, a facsimile document received by the facsimile device 1000 can be printed by the printer device 30 having no facsimile function. Thus, the linkage system can increase devices linkable to the facsimile device 1000, and reduce the installation cost at the time of environment construction. Furthermore, the linkage system can reduce the possibility of failure in printing.

Fourth Embodiment

In a fourth embodiment, recovery processing is performed when a print request is not normally transmitted to a printer device from a linkage server due to a power cut of the facsimile device, a power cut of the linkage server, a network error, or the like. In the following, a point different from the first embodiment is mainly explained, and the same names and reference symbols as the first embodiment are assigned to components having similar functions as those of the first embodiment, and the explanation thereof is omitted.

Figure 12:
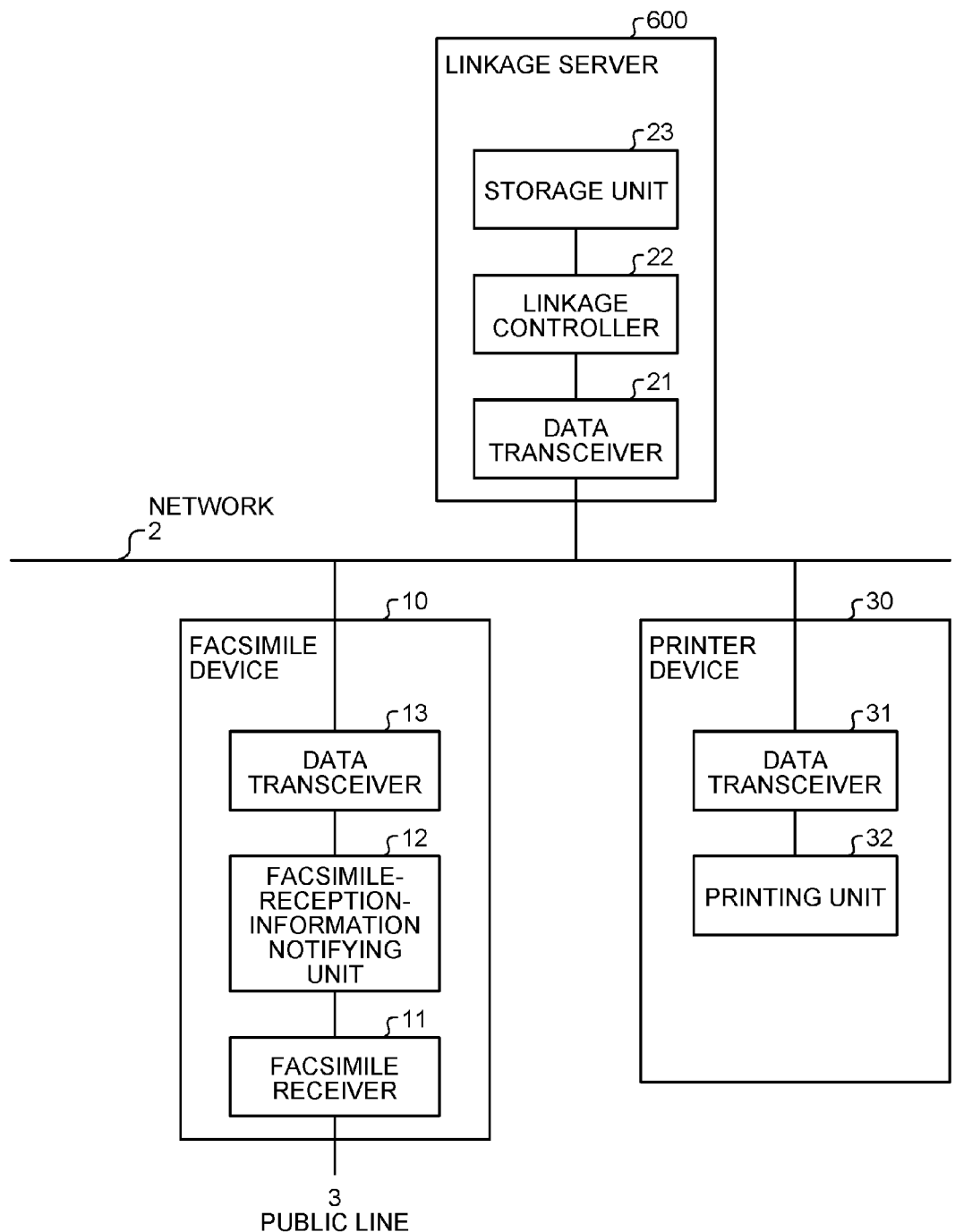
FIG. 12 is a block diagram showing one example of a functional configuration of a facsimile device, a linkage server, and a printer device according to a fourth embodiment.

FIG. 12 is a block diagram illustrating one example of a configuration of a linkage system and a functional configuration of the facsimile device 10, the linkage server 600, and the printer device 30 according to the fourth embodiment.

As illustrated in FIG. 12, the linkage system of the present embodiment has a configuration in which the facsimile device 10, the linkage server 600, and the printer device 30 are connected to a network. The configuration of the facsimile device 10 and the printer device 30 are the same as those of the first embodiment. The linkage server 600 includes, as illustrated in FIG. 12, the data transceiver 21, the linkage controller 22, and the storage unit 23.

The storage unit 23 stores facsimile reception information, unprinted facsimile-reception information (facsimile reception information that has not been printed by the printing unit 32), data necessary for various kinds of processing, and the like. The storage unit 23 is connected to the linkage controller 22, and can be implemented, for example, by the HDD 106. The data transceiver 21 and the linkage controller 22 are the same as those of the second embodiment.

Figure 13:
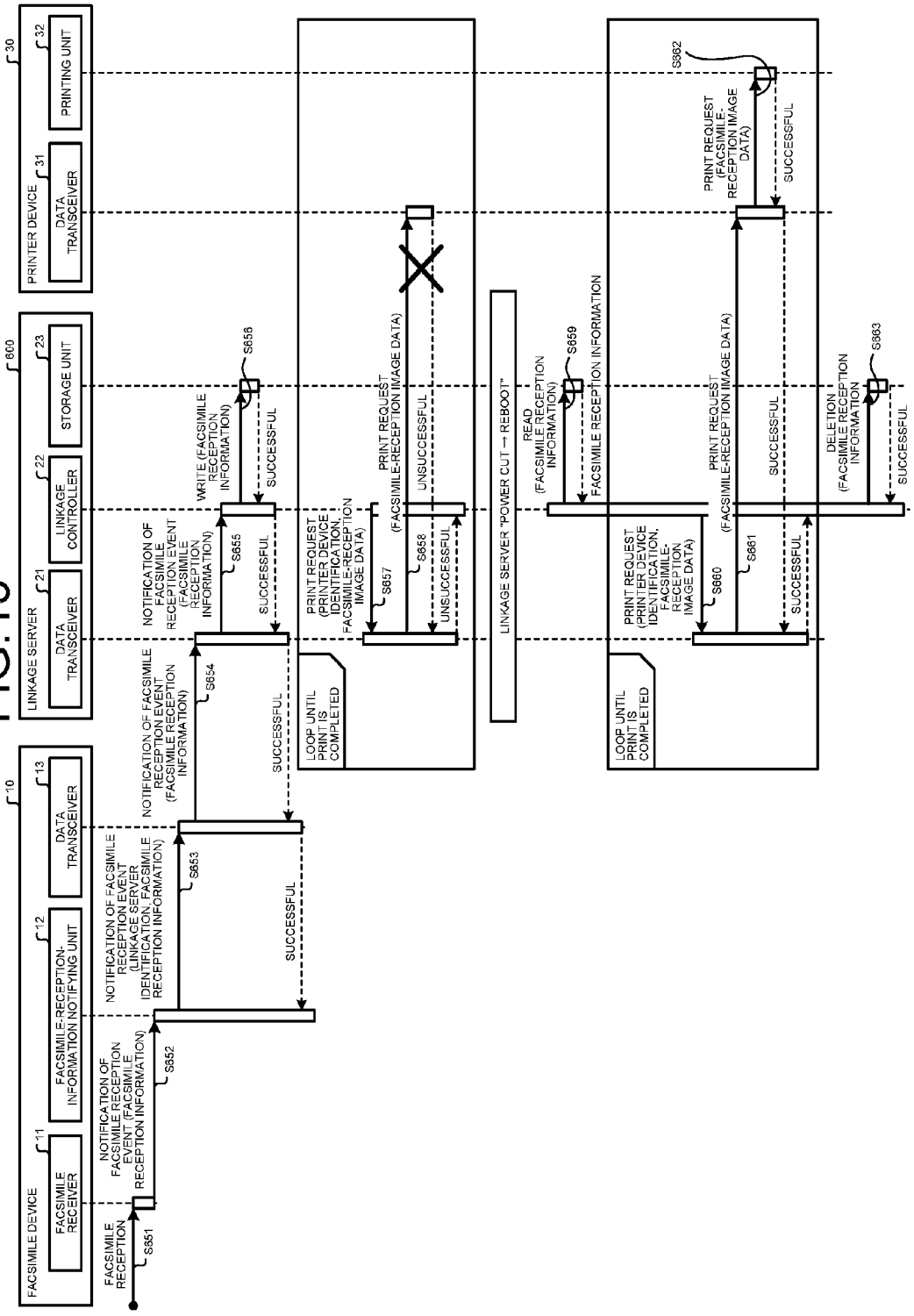
FIG. 13 is a sequence diagram for explaining one example of a processing procedure performed in the linkage system according to the fourth embodiment.

Next, linkage processing of the present embodiment is explained. FIG. 13 is a sequence diagram for explaining one example of a processing procedure performed in the linkage system according to the fourth embodiment. In FIG. 13, a case in which, the linkage server 20 performs recovery processing when the linkage server 20 shuts the power and a print request is not normally transmitted to the printing unit 32 due to a network error or the like is explained.

Processing from reception of a facsimile until reception of a facsimile reception event at the linkage server 600 (steps S651 to S655) is performed similarly to the processing at steps S501 to S505 in FIG. 4 of the first embodiment.

When receiving a facsimile reception event, the linkage controller 22 writes facsimile reception information received together with the facsimile reception event in the storage unit 23 to be stored therein (step S656). When printing is normally completed, the facsimile reception information in the storage unit 23 is deleted. Therefore, facsimile reception information remaining in the storage unit 23 means that printing is not normally completed.

Subsequently, the linkage controller 22 extracts facsimile-reception image data included in the facsimile reception information, and transmits a print request of the facsimile-reception image data to the data transceiver 21 specifying printer device identification of a desired printer device (step S657). The data transceiver 31 transmits the print request of the facsimile-reception image data to a printer device specified by the printer device identification (step S658). However, the transmission of the print request is unsuccessful due to a network error, or the like. The transmission processing of a print request at steps S657 and S658 is repeated until printing is completed.

Suppose that the linkage server 600 thereafter shuts the power and reboots itself. After the reboot of the linkage server 600, the linkage controller 22 determines whether unprinted facsimile-reception information is present in the storage unit 23, and when present, determines that a print request is not normally transmitted to the printing unit 32, and performs the recovery processing.

Specifically, the linkage controller 22 reads facsimile reception information stored in the storage unit 23 (step S659). The linkage controller 22 then extracts facsimile-reception image data included in the facsimile reception information, and transmits a print request of the facsimile-reception image data to the data transceiver 21, specifying a printer device identification of a desired printer device (step S660). The data transceiver 31 transmits the print request of the facsimile-reception image data to the printer device specified by the printer device identification (step S661). At this time, as the linkage server 600 has been rebooted, the print request is normally transmitted to the printer device 30. In the printer device 30, the data transceiver 31 receives the print request to transfer to the printing unit 32, and the printing unit 32 prints the facsimile-reception image data (step S662). When printing is normally completed, a reception-completion notifying message is transmitted to the printing unit 32, the data transceiver 31, the data transceiver 21, and the linkage controller 22 of the linkage server 600. Receiving the reception-completion notifying message, the linkage controller 22 determines that the printing is normally completed, and deletes the facsimile reception information in the storage unit 23 (step S663).

As described, when determining that unprinted facsimile-reception information is present in the storage unit 23, the linkage controller 22 transmits a print request to the printing unit 32 based on the information, thereby performing error recovery.

As described, according to the linkage system of the present embodiment, even when a print request is not normally transmitted to the printer device 30 from the linkage server 600 due to a network error, or the like, by performing the recovery processing, a facsimile document received by the facsimile device 10 can be printed by the printer device 30 having no facsimile function. Thus, the linkage system can increase devices linkable to the facsimile device 10, and reduce the installation cost at the time of environment construction. Furthermore, the linkage system can reduce the possibility of failure in printing.

Fifth Embodiment

While the linkage system is constituted of the facsimile device, the linkage server, and the printer device in the first to the fourth embodiments, it is constituted of a master device 1400 and a slave device 30a in the fifth embodiment.

Figure 14:
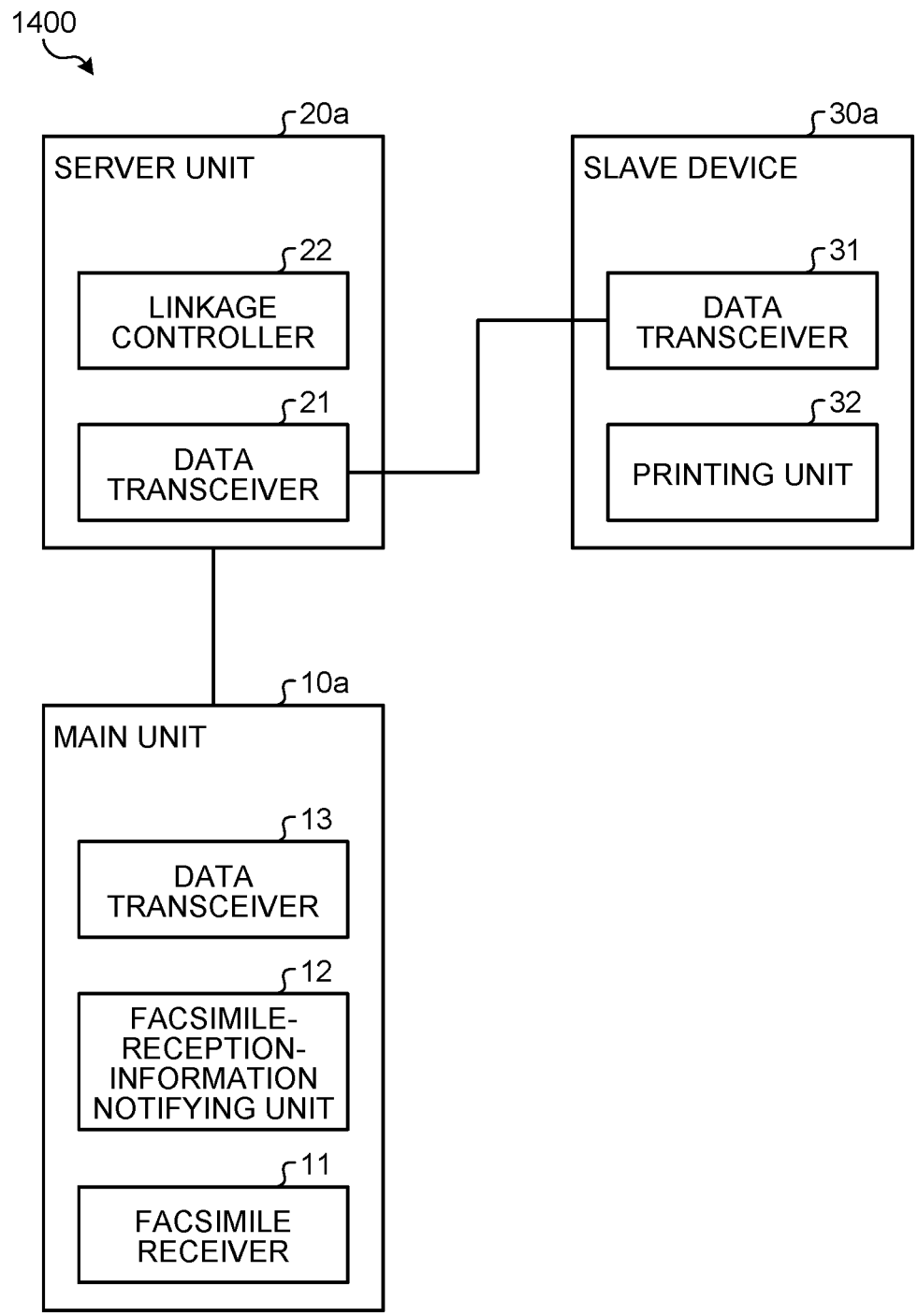
FIG. 14 is a configuration diagram of a linkage system according to a fifth embodiment.

FIG. 14 is a configuration diagram of a linkage system according to a fifth embodiment. The linkage system of the present embodiment has a configuration in which the master device 1400 and the slave device 30a are connected to a network as illustrated in FIG. 14.

The master device 1400 has a configuration in which a server unit 20a and a main unit 10a are connected as illustrated in FIG. 14. The server unit 20a has a function similar to that of the linkage server 20 of the first embodiment, and includes the linkage controller 22 and the data transceiver 21. The functions of the linkage controller 22 and the data transceiver 21 are the same as those of the first embodiment.

The main unit 10a of the master device 1400 has a function similar to that of the facsimile device 10 of the first embodiment, and includes the data transceiver 13, the facsimile-reception-information notifying unit 12, and the facsimile receiver 11. The functions of the data transceiver 13, the facsimile-reception-information notifying unit 12, and the facsimile receiver 11 are the same as those of the first embodiment.

The slave device 30a has a function similar to that of the printing device 30 of the first embodiment, and includes the data transceiver 31 and the printing unit 32.

As for the linkage processing for facsimile reception by the linkage system of the present embodiment, the processing explained in the first embodiment is performed among the server unit 20a and the main unit 10a of the master device 1400, and the slave device 30a. Therefore, in the present embodiment, effects similar to those of the first embodiment are produced.

Although it is configured such that the server unit 20a of the master device 1400 has the same function as the linkage server 20 of the first embodiment, the main unit 10a of the master device 1400 has the same function as the facsimile device 10 of the first embodiment, and the slave device 30a has the same function as the printer device 30 of the first embodiment in the present embodiment, it may be configured to have the same functions of the linkage server, the facsimile device, and the printer device of the second to the fourth embodiments, respectively. Moreover, multiple units of the slave device 30a may be arranged, and a part of the slave devices 30a may be configured as a facsimile device, and the other of the slave devices 30a may be configured as a printer device.

Program

A program that is executed in the facsimile device, the printer device, the linkage server, the master device (the server unit, the main unit), and the slave device of the above embodiments (hereinafter, "respective devices in the above embodiments") is stored in a computer-readable recording medium such as a compact disk read-only memory (CD-ROM), a compact disk recordable (CD-R), a memory card, a digital versatile disk (DVD), and a flexible disk (FD), in a file in an installable format or in an executable format, to be provided.

Moreover, the program that is executed by the respective devices of the above embodiments may be stored in a computer that is connected to a network such as the Internet, to be provided by being downloaded through the network. Furthermore, the respective devices of the above embodiments may be provided or distributed through a network such as the Internet. Moreover, the program that is executed by the respective devices of the above embodiments may be installed in a ROM or the like to be provided.

The program that is executed by the respective devices of the above embodiments has a module structure to implement the respective components described above on a computer. As actual hardware, for example, by reading the program from the ROM onto the RAM to execute it by a CPU, the respective functional units are implemented on a computer.

According to an embodiment of the present invention, a linkage system that enables to increase devices linkable to a facsimile device, and to reduce the installation cost at the time of environment construction can be provided.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A linkage system comprising:
a facsimile device;
an image forming device; and
a linkage device through a network,
the facsimile device including a first non-transitory medium including first computer readable instructions; and
one or more first processors configured to execute the first computer readable instructions to
receive a facsimile document through a public line; and
transmit to the linkage device reception information about the facsimile document together with a reception event indicating that the facsimile document is received, the linkage device including
a second non-transitory medium including second computer readable instructions; and
one or more second processors configured to execute the second computer readable instructions to
transmit a print request to print the facsimile document included in the reception information to the image forming device when the reception event and the reception information are received, and
the image forming device including
a third non-transitory medium including third computer readable instructions; and
one or more third processors configured to execute the third computer readable instructions to
print the facsimile document based on the print request
wherein the at least one first processor is further configured to
store in the non-transitory medium the reception information when receiving the facsimile document, and
wherein the at least one second processor is further configured to
store the reception information when the reception event and the reception information are received;
transmit a request for a list of received facsimile documents to the facsimile device periodically,
receive the requested list of the received facsimile documents,
determine whether an unsent facsimile document is present based on the received list of the received facsimile documents and one or more pieces of the reception information stored in the second non-transitory medium, and transmit, when an unsent facsimile document is present in the list of the received facsimile documents, an acquisition request to acquire reception information relating to the unsent facsimile document to the facsimile device, and wherein the at least one first processor is further configured to create, when the request for a list of the received facsimile documents is received, a list of the received facsimile documents based on the one or more pieces of the reception information stored in the first non-transitory medium, and transmit the list of the received facsimile documents to the linkage device, and acquire, when the acquisition request is received, the reception information relating to the unsent facsimile document from the first non-transitory medium, and transmit the acquired reception information to the linkage device.

2. The linkage system according to claim 1, wherein the at least one first processor is further configured to determine whether an unsent facsimile document is present based on the list and one or more pieces of the reception information stored in the first non-transitory medium, acquire the reception information relating to the unsent facsimile document from the first non-transitory medium, and transmit the received reception information to the linkage device.

3. The linkage system according to claim 1, wherein the at least one first processor is further configured to store in the first non-transitory medium the reception information when the facsimile document is received, and delete the reception information stored in the first non-transitory medium when transmission of the reception information to the linkage device is normally completed, and determine, when the facsimile device is rebooted, whether transmission of the reception information to the linkage device is normally completed based on a presence or absence of the reception information in the first non-transitory medium.

4. The linkage system according to claim 1, wherein the at least one second processor is further configured to store the received reception information when the reception event and the reception information are received from the facsimile device, and delete the reception information stored in the second non-transitory medium when receiving notification indicating that printing by the image forming device is normally complete, and determines, when the linkage device is rebooted, whether transmission of the print request to the image forming device is normally completed based on a presence or absence of the reception information in the second non-transitory medium.

* * * * *